United States Patent [19]

Schwander et al.

[11] Patent Number: 4,929,719
[45] Date of Patent: May 29, 1990

[54] FIBER-REACTIVE DYES CONTAINING AN ANILINE RADICAL WHICH CARRIES TWO DIFFERENT VINYLSULFONYL MOIETIES

[75] Inventors: Hansrudolf Schwander, Riehen; Athanassios Tzikas, Pratteln; Peter Aeschlimann, Allschwil, all of Switzerland

[73] Assignee: Ciba-Geigy Corporation, Ardsley, N.Y.

[21] Appl. No.: 394,302

[22] Filed: Aug. 10, 1989

Related U.S. Application Data

[63] Continuation of Ser. No. 172,617, Mar. 24, 1988, abandoned.

[30] Foreign Application Priority Data

Mar. 27, 1987 [CH] Switzerland ............ 1182/87

[51] Int. Cl.$^5$ .............. C09B 62/02; C09B 62/507; C09B 62/44; C09B 62/62
[52] U.S. Cl. .............. 534/604; 534/605; 534/617; 534/622; 534/623; 534/624; 534/625; 534/626; 534/627; 534/628; 534/629; 534/630; 534/631; 534/632; 534/643; 534/642; 534/635; 534/636; 534/637; 534/638; 534/641; 540/127; 540/133; 540/140; 544/181; 544/187; 544/208; 544/210
[58] Field of Search .............. 534/617-643, 534/604, 605

[56] References Cited

U.S. PATENT DOCUMENTS

| | | | |
|---|---|---|---|
| 4,560,388 | 12/1985 | Rohrer ............ | 534/643 X |
| 4,585,460 | 4/1986 | Schwander et al. ...... | 534/642 X |
| 4,754,023 | 6/1988 | Tzikas et al. ............ | 534/618 |
| 4,754,024 | 6/1988 | Schwander ............ | 534/642 |
| 4,766,206 | 8/1988 | Tzikas ............ | 534/619 |
| 4,786,721 | 11/1988 | Tzikas et al. ............ | 534/617 |

FOREIGN PATENT DOCUMENTS

| | | | |
|---|---|---|---|
| 0182173 | 5/1986 | European Pat. Off. ...... | 534/642 |
| 0210951 | 2/1987 | European Pat. Off. ...... | 534/642 |
| 3441274A1 | 5/1986 | Fed. Rep. of Germany ...... | 534/642 |

OTHER PUBLICATIONS

Chem. Abst. 106, 20004g (1987).

Primary Examiner—Floyd D. Higel
Attorney, Agent, or Firm—George R. Dohmann

[57] ABSTRACT

Reactive dyes which are particularly suitable for dyeing and printing cellulose containing fiber materials by the cold padbatch process and which produce, in high dye yield, dyeings and prints having good fastness properties containing the radical of an amine of the formula

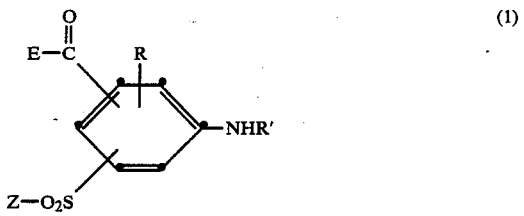

in which R is hydrogen, halogen, hydroxyl or sulfo, Z is a radical of the formula —CH=CH$_2$ or —CH$_2$—CH$_2$—Y, Y is a detachable group, R' is hydrogen or C$_1$-C$_4$alkyl which is unsubstituted or substituted by —COOH, —CN, —OH or —SO$_3$H, and E is a radical of the formula

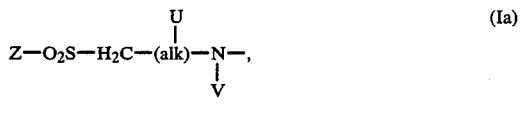

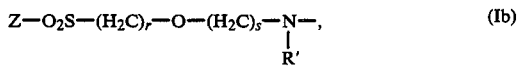

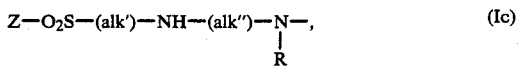

or

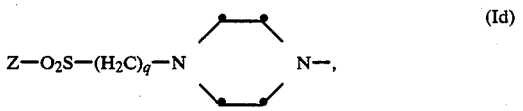

in which R' and Z are as defined above, alk, alk' and alk'' independently of one another are a C$_1$-C$_6$alkylene radical, U is hydrogen, halogen, hydroxyl, sulfato, C$_1$-C$_4$alkanoyloxy, cyano, carboxyl, C$_1$-C$_4$-alkoxycarbonyl, carbamoyl or a radical —SO$_2$—Z in which Z is as defined above, V is hydrogen, substituted or unsubstituted C$_1$-C$_4$alkyl or a radical of the formula

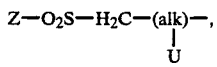

in which Z, alk and U are as defined above, and q, r and s independently of one another are an integer from 1 to 6.

21 Claims, No Drawings

FIBER-REACTIVE DYES CONTAINING AN ANILINE RADICAL WHICH CARRIES TWO DIFFERENT VINYLSULFONYL MOIETIES

This application is a continuation, of application Ser. No. 172,617, filed 3/24/88, now abandoned.

Reactive dyes have been employed for a long time and on a large scale for dyeing and printing textiles composed of fibre materials, and nowadays a large number of serviceable reactive dyes are available with different properties and suitable for various fields of application. However, in view of the increasingly high requirements set for reactive dyeings in respect of economy in operation, application technique and level of fastness, the technical level which has been reached is frequently not entirely satisfactory.

Thus, for example, it is frequently found that the degree of fixation is too low and that the difference between the degree of exhaustion and the degree of fixation is too great (high hydrolysis loss), so that a considerable part of the reactive dye is lost to the dyeing process. The build-up capacity also leaves something to be desired in many cases.

The present invention was based on the object of finding novel, improved reactive dyes which have a high reactivity and a good build-up capacity, which can be used for dyeing at a high fixation yield, which are, in particular, suitable for the exhaustion dyeing process and which produce dyeings which are fast to wet processing and light on cellulose-containing fibre material.

It has been found that the novel reactive dyes defined later in the text satisfy these requirements.

The invention relates to reactive dyes containing the radical of an amine of the formula

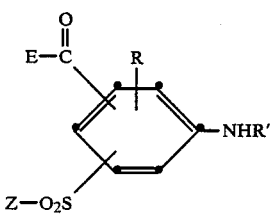

in which R is hydrogen, halogen, hydroxyl or sulfo, Z is a radical of the formula —CH=CH$_2$ or —CH$_2$—CH$_2$—Y, Y is a detachable group, R' is hydrogen or C$_1$-C$_4$alkyl which is unsubstituted or substituted by —COOH, —CN, —OH or —SO$_3$H, and E is a radical of the formula Z—O$_2$S—H$_2$C—(alk)—N—,  (Ia)
                    |
                    V Z—O$_2$S—(H$_2$C)$_r$—O—(H$_2$C)$_s$—N—,  (Ib)
                                |
                                R'

Z—O$_2$S—(alk')—NH—(alk")—N—,  (Ic)
                               |
                               R or

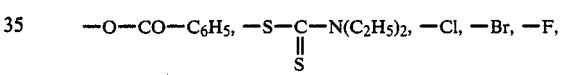  (Id)

in which R' and Z are as defined above, alk, alk' and alk" independently of one another are a C$_1$-C$_6$alkylene radical, U is hydrogen, halogen, hydroxyl, sulfato, C$_1$-C$_4$alkanoyloxy, cyano, carboxyl, C$_1$-C$_4$alkoxycarbonyl, carbamoyl or a radical —SO$_2$—Z in which Z is as defined above, V is hydrogen, substituted or unsubstituted C$_1$-C$_4$alkyl or a radical of the formula Z—O$_2$S—H$_2$C—(alk)—,
                 |
                 U in which Z, alk and U are as defined above, and q, r and s independently of one another are an integer from 1 to 6.

In these formulae the detachable group Y is, for example, an inorganic or organic radical which can be detached under alkaline conditions.

One of the following groups which can be detached under anionic conditions is an example of an inorganic or organic radical which can be detached under alkaline conditions:

—OSO$_3$H, —SSO$_3$H, —OCOCH$_3$, —OPO$_3$H$_2$,

—O—CO—C$_6$H$_5$, —S—C(=S)—N(C$_2$H$_5$)$_2$, —Cl, —Br, —F,

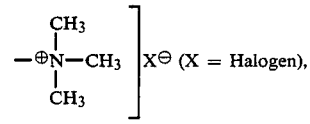

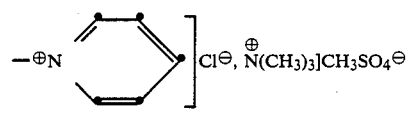

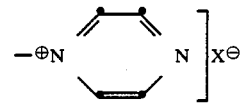

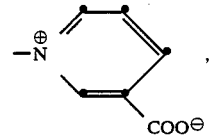

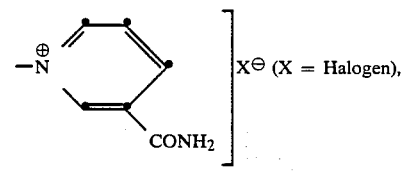

-O-SO$_2$-C$_6$H$_4$-CH$_3$, -O-SO$_2$-N(CH$_3$)$_2$,

-N(CH$_3$)-SO$_2$-CH$_3$, -O-SO$_2$-CH$_3$, -S-C≡N,

-OSO$_2$-C$_6$H$_4$-SO$_3$H, [-S$^⊕$(CH$_3$)$_2$] CH$_3$SO$_4^⊖$,

-⊖O-SO$_2$-C$_6$H$_5$, -OOCCCl$_3$, -OOCCHCl$_2$,

-OOCCH$_2$Cl, -O-O$_2$SR (R = Alkyl oder Aryl),

-O-SO$_2$-N(C$_2$H$_5$)$_2$, [-⊕N(CH$_3$)-NH$_2$] Cl$^⊖$,

[benzisoxazolinium chloride structure] Cl$^⊖$

Y is preferably an —OSO$_3$H, —SSO$_3$H, —OCOCH$_3$, —OPO$_3$H$_2$, —Cl or —O—CO—C$_6$H$_5$ group and is particularly preferably —OSO$_3$H.

The radicals Z in the formulae (1), (Ia), (Ib), (Ic) and (Id) can be different or, preferably, identical.

As halogen, substituent R is, for example, fluorine or bromine and particularly chlorine.

R is preferably hydrogen or chlorine, particularly preferably hydrogen.

Examples of suitable radicals R' are hydrogen, methyl, ethyl, n-propyl, isopropyl, n-, sec- or tert-butyl, carboxymethyl, sulfomethyl, cyanoethyl or hydroxyethyl.

R' is preferably methyl and particularly preferably hydrogen.

Alk, alk' and alk" are independently of one another, for example, a methylene or ethylene radical or a linear or branched propylene, butylene, pentylene or hexylene radical. Alk, alk' and alk" are preferably, independently of one another, a linear C$_1$-C$_4$alkylene radical.

Alk is particularly preferably methylene; alk' and alk" are particularly preferably ethylene.

U is preferably hydrogen, hydroxyl, sulfato, acetoxy, carboxyl, methoxycarbonyl, ethoxycarbonyl or the group —SO$_2$—Z in which Z is as defined above; U is particularly preferably hydrogen.

As a substituted C$_1$-C$_4$alkyl radical, V can, for example, be a C$_1$-C$_4$alkyl radical which is substituted by halogen, hydroxyl, cyano, carboxyl, sulfo, sulfato, C$_1$-C$_4$alkoxy or C$_1$-C$_4$alkoxycarbonyl.

The following are examples of substituted C$_1$-C$_4$alkyl radicals: carboxymethyl, β-carboxyethyl, methoxycarbonylmethyl, ethoxycarbonylmethyl, β-carboxyethyl, methoxycarbonylmethyl, ethoxycarbonylmethyl, β-methoxyethyl, β-ethoxyethyl, β-chloroethyl, γ-bromopropyl, β-hydroxyethyl, β-hydroxybutyl, β-cyanoethyl, sulfomethyl, β-sulfoethyl and β-sulfatoethyl.

If V is a radical of the formula $$Z-O_2S-H_2C-(alk)-\underset{U}{|}-,$$

this can be different from the second radical $$Z-O_2S-H_2C-(alk)-\underset{U}{|}-$$

present in formula (Ia) or can, preferably, be identical with the latter.

V is preferably hydrogen, methyl, ethyl or the group $$Z-O_2S-H_2C(alk)-\underset{U}{|};$$

V is particularly preferably hydrogen.

q, r and s independently of one another are preferably an integer from 1 to 4; q, r and s are each particularly preferably the number 2.

E is preferably a radical of the formula (Ib) and especially a radical of the formula (Ia).

A preferred embodiment of the invention embraces reactive dyes containing a radical of the formula

[structure (Ia): benzene ring with E'-C(=O)- and R substituents, Z-O$_2$S- and -NH$_2$ groups]    (Ia)

in which E' is a radical of the formula $$Z-O_2S-H_2C-(CH_2)_{\overline{1-3}}-\underset{H}{N}- \quad (Ia')$$

or $$Z-O_2S-(H_2C)_{\overline{1-4}}-O-(H_2C)_{\overline{1-4}}-\underset{H}{N}- \quad (Ib')$$

and R and Z are as defined above.

An embodiment of the invention which is particularly preferred embraces reactive dyes containing a radical of the amine of the formula

[structure (Ib): Z-O$_2$S-H$_2$C-H$_2$C-NH-C(=O)- on benzene ring with R, Z-O$_2$S- and -NH$_2$]    (Ib)

in which R and Z are as defined above.

The dyes according to the invention containing the radical of an amine of the formula (1) are fibre-reactive. Fibre-reactive dyes are to be understood as meaning dyes capable of reacting with the hydroxyl groups of cellulose or with the reactive centres of natural or synthetic polyamides with the formation of covalent chemical bonds.

The reactive dyes according to the invention can, for example, have the formula

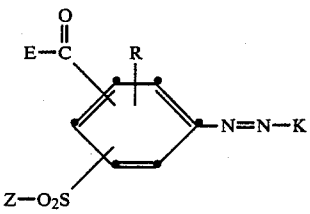

(2)

in which the meanings and preferences mentioned above apply to E, R and Z, and K is the radical of a coupling component of the benzene or naphthalene series or of the heterocyclic series; metal complexes of dyes of the formula (2) are also suitable.

The radical K can, in turn, itself contain azo groups, i.e. it can be the radical of an azo compound, in particular a monoazo compound. If K is the radical of a coupling component of the benzene or naphthalene series, K is thus preferably a benzene, naphthalene, naphthylazobenzene or phenylazonaphthalene radical which can have further substituents as indicated below. If K is the radical of a coupling component of the heterocyclic series, examples of suitable radicals are a pyrazolone, phenylpyrazolone, pyrazole or pyridone radical.

The radical K can contain, attached to its skeleton, the substituents customary in azo chemistry.

The following are examples of suitable substituents on the radical K: $C_1$–$C_4$alkyl, which in general embraces methyl, ethyl, n-propyl, isopropyl or n-, sec- or tert-butyl; $C_1$–$C_4$alkoxy, which is to be understood as meaning, in general, methoxy, ethoxy, n-propoxy, isopropoxy or n-, sec- or tert-butoxy; amino; N-mono-$C_1$–$C_4$alkylamino or N,N-di-$C_1$–$C_4$alkylamino in which the alkyl can be unsubstituted or further substituted, for example by —OH, —OCOCH$_3$, —OSO$_3$H, —CN or halogen, for example methylamino, ethylamino, n-propylamino, isopropylamino, n-, sec- or tert-butylamino, N,N-dimethylamino, N,N-diethylamino, β-chloroethylamino, β-cyanoethylamino, β-acetoxyethylamino, N-(β-hydroxyethyl), N-ethylamino, β-sulfatoethylamino, N,N-di-(β-hydroxyethyl)-amino, N,N-di-(β-sulfatoethyl)-amino or hydroxypropylamino; phenylamino; $C_1$–$C_4$alkanoylamino, especially acetylamino or propionylamino; benzoylamino; $C_1$–$C_4$alkoxycarbonyl, for example methoxycarbonyl or ethoxycarbonyl; nitro; cyano; trifluoromethyl; halogen, which is to be understood as meaning, in general, fluorine, chlorine and bromine; hydroxyl; carboxyl; sulfo; sulfomethyl; sulfamoyl; N-mono-$C_1$–$C_4$alkylsulfamoyl or N,N-di-$C_1$–$C_4$alkylsulfamoyl; carbamoyl; N-mono-$C_1$–$C_4$alkylcarbamoyl or N,N-di-$C_1$–$C_4$alkylcarbamoyl; or ureido.

Reactive dyes of the formula (2) which should also be taken into consideration are those in which the radical K also includes a further reactive radical, for example a chlorotriazine or fluorotriazine radical, halogenopyrimidine radical or vinylsulfonyl radical.

The additional reactive radicals included in K can, for example, be attached to K via amino groups.

The coupling components advantageously contain at least one sulfo group, an aliphatic sulfato radical, for example an N-(β-sulfatoethyl)-amino group and especially an N,N-di-(β-sulfatoethyl)-amino group or an aliphatic sulfatable substituent, for example an N-(β-hydroxyethyl), N-ethylamino or, in particular, N,N-di-(β-hydroxyethyl)-amino group, and can, in addition, be further substituted by one or more of the abovementioned radicals.

Preferred reactive dyes of the formula (2) are monoazo and disazo dyes.

The following are preferred subgroups of the reactive dyes of the formula (2) according to the invention:

Reactive dyes of the formula

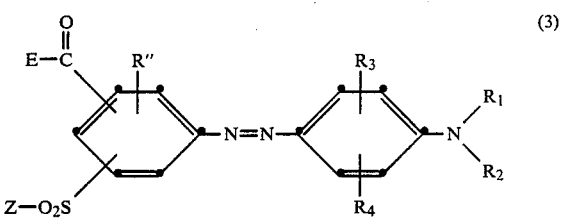

(3)

in which the abovementioned meanings and preferences apply to E and Z, R" is hydrogen or chlorine, $R_1$ and $R_2$ independently of one another are hydrogen, $C_1$–$C_4$alkyl which is unsubstituted or substituted by —OH, —OSO$_3$H, —OCOCH$_3$, —CN or halogen, or phenyl, and $R_3$ and $R_4$ independently of one another are hydrogen, halogen, $C_1$–$C_4$alkyl, $C_1$–$C_4$alkoxy, trifluoromethyl, $C_1$–$C_4$alkanoylamino or sulfo.

Reactive dyes of the formula

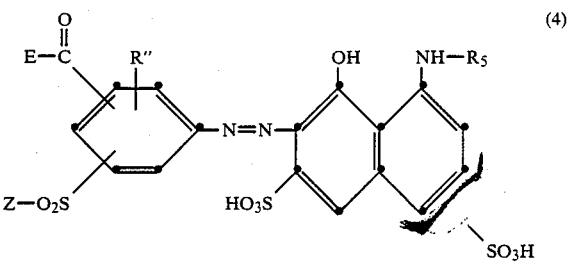

(4)

in which E, Z and R" are as defined under formula (3) and $R_5$ is $C_1$–$C_4$-alkanoyl, benzoyl or a radical of the formula

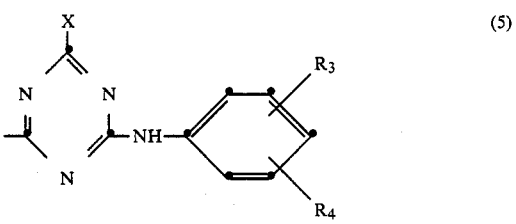

(5)

in which X is selected from the group comprising chlorine, methyl, methoxy, carboxyl or sulfo.

Reactive dyes of the formula

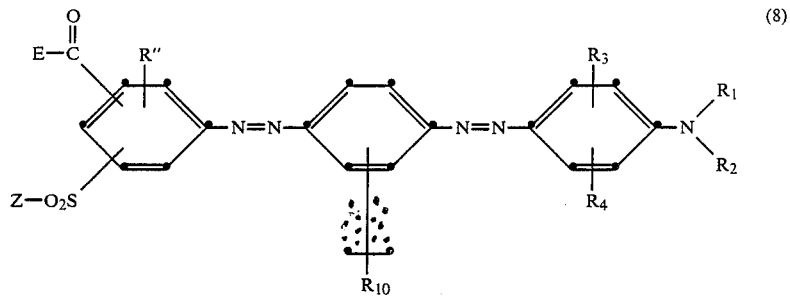

(8)

in which E, Z, R", $R_1$, $R_2$, $R_3$ and $R_4$ are as defined under the formula (3) and $R_{10}$ is $C_1$-$C_4$alkyl, $C_1$-$C_4$alkoxy, halogen or sulfo.

Reactive dyes of the formula

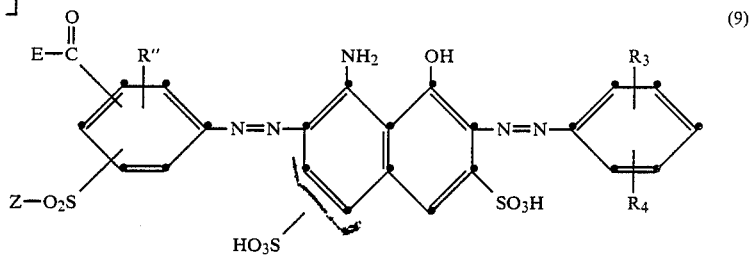

(9)

in which E, R", Z, $R_3$ and $R_4$ are as defined under the formula (3).

Heavy metal complexes of reactive dyes of the formula (2) containing groups capable of forming metal complexes, for example hydroxyl, carboxyl, amino or sulfo; suitable complex-forming heavy metals are, in particular, copper, nickel, cobalt and chromium.

Compounds which are particularly preferred are those of the formulae (3) to (9) in which R" is hydrogen and Z is the β-sulfatoethyl, β-chloroethyl or vinyl group.

Compounds which are also preferred are those of the formulae (3) to (9) in which the group Z—$O_2$S— is located in the para-position, and the group E—OC— is located in the meta-position, in relation to the azo group.

The compounds of the formula (2) can, for example, be prepared by reacting a diazo component of the formula

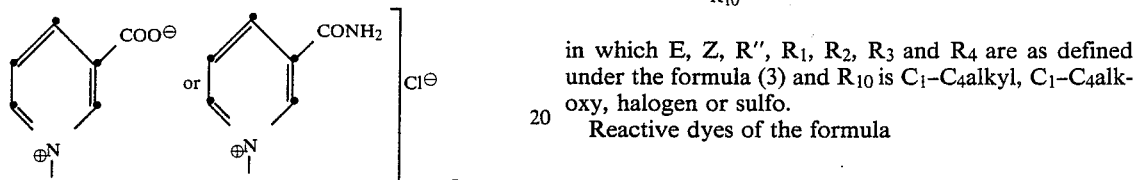

and especially chlorine or fluorine and $R_3$ and $R_4$ are as defined under formula (3).

Reactive dyes of the formula

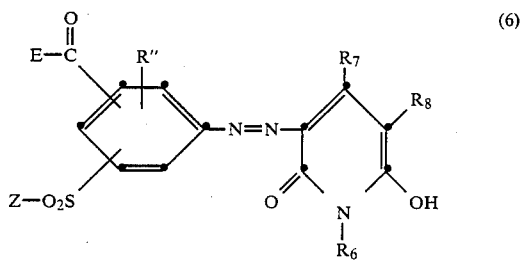

(6)

in which $R_6$ and $R_7$ independently of one another are hydrogen, $C_1$-$C_4$-alkyl or phenyl and $R_8$ is hydrogen, cyano, carbamoyl or sulfomethyl and E, Z and R" are as defined under the formula (3).

Reactive dyes of the formula

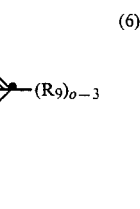

(6)

in which E, Z and R" are as defined under the formula (3) and $R_9$ is 0 to 3 identical or different substituents

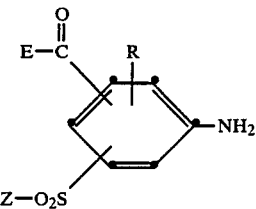

or a precursor thereof with a coupling component of the formula

H—K  (10)

by diazotization and coupling to give reactive dyes of the formula (2), or converting the intermediates obtained into the desired final dyes and, if appropriate, subsequently carrying out a further modification reaction. In these formulae E, Z, R and K are each as defined above.

The molar ratio of the starting materials must be selected to suit the composition of the end product, depending on whether one or two coupling points are present in K.

If desired, a precursor is used instead of a coupling component of the formula (10), and the final dye is prepared by a further diazotization and/or coupling reaction or other conversion reactions with the intermediate.

A modified embodiment of the process consists in first preparing a dye containing a precursor of the reactive radical and subsequently converting this precursor into the final stage, for example by esterification or an addition reaction. For example, a dye in which Z is a radical HO—CH$_2$CH$_2$— can be prepared and the intermediate can be reacted with sulfuric acid before or after acylation, so that the hydroxyl group is converted into the sulfato group; or an analogous dye in which Z is the group H$_2$C=CH— is used, and thiosulfuric acid is added onto the intermediate, with the formation of a radical HO$_3$SS—CH$_2$CH$_2$—. The sulfation of the hydroxyl group in a dye of the formula (2) or a suitable precursor is effected, for example, by reaction with concentrated sulfuric acid between 0° C. and a moderately elevated temperature. The sulfation can also be effected by reacting the hydroxy compound with two equivalents of chlorosulfonic acid per hydroxyl group in a polar organic solvent, for example N-methylpyrrolidone, at 10° to 80° C. It is preferable to effect the sulfation by introducing the compound concerned into sulfuric acid monohydrate at temperatures between 5° and 15° C. The introduction of another radical for Z into a compound of the formula (2) or an intermediate, instead of a halogen atom or the sulfato group, for example a thiosulfato or phosphato group, is effected in a manner known per se.

Elimination reactions can also be carried out after the synthesis. For example, reactive dyes of the formula (2) containing sulfatoethylsulfonyl radicals can be treated with agents which eliminate hydrogen halide, such as sodium hydroxide, whereby the sulfatoethylsulfonyl radicals are converted into vinylsulfonyl radicals.

The diazotization of the diazo components or of the intermediates containing a diazotizable amino group is effected, as a rule, by the action of nitrous acid in aqueous mineral acid solution at a low temperature. The coupling with the coupling component is effected at strongly acid, neutral or weakly alkaline pH values.

If groups capable of forming metal complexes, such as hydroxyl, carboxyl, amino or sulfo, are present in the reactive dyes which have been prepared, the subsequent metallization of the reactive dyes is also possible. For example, metal complex azo dyes are obtained by treating, with heavy metal donors, azo compounds obtained in accordance with the invention which contain complex-forming groups, for example hydroxyl or carboxyl groups, in the ortho-ortho'-position relative to the azo bridge. Copper complexes of reactive dyes of the formula (2) are of particular interest. Suitable methods of metallization are, in addition to those mentioned above, also dealkylating metallization and, for the preparation of copper complexes, oxidative coppering.

The most important process variants are described in the illustrative embodiments.

The compounds of the formula (1) and (1c) are novel and constitute a further subject of the invention. They can, for example, be prepared by reacting a compound of the formula

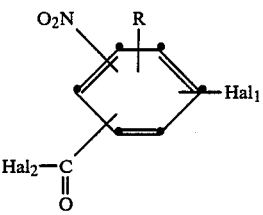

in which R is as defined above and Hal$_1$ and Hal$_2$ independently of one another are halogen and are preferably both chlorine, first with an amine of the formula

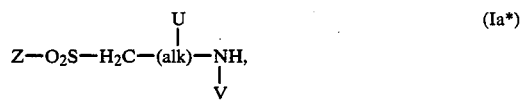

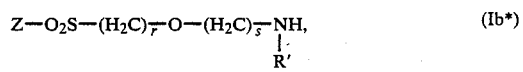

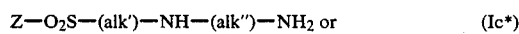

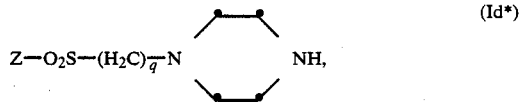

in which Z, U, V, R', alk, alk', alk'', r, s and q are as defined above, and then with 2-mercaptoethanol, oxidizing the resulting compound to give the disulfonyl compound, reducing the nitro group to the amino group, if appropriate introducing a detachable group, for example —OSO$_3$H, —OCOCH$_3$, —SSO$_3$H or —O-PO$_3$H$_2$, and/or, if appropriate, alkylating the amino group in a manner known per se.

As a modification of the process described above, it is also possible to employ the corresponding amino compound instead of the nitro compound of the formula (11), in which case the stage of reducing the nitro group is omitted.

A further variant of the process described above consists in employing suitable precursors instead of the amines of the formulae (Ia*) to (Id*) and subsequently converting these precursors into the corresponding amines.

Examples of suitable precursors are the thioether-amines analogous to the formulae (Ia*) to (Id*), which, after the reaction with a compound of the formula (11), can be oxidized in a known manner to give the corresponding sulfones.

It is also possible first to react suitable halogenoalkylamines with the acid chloride of the formula (11) and to react the compounds obtained thereby with 2-mercaptoethanol and a sodium alcoholate in alcohol to give the thioether-amines mentioned above, which can then, in turn, be oxidized to give the sulfones of the formulae (Ia*) to (Id*).

It is preferable to employ amines of the formulae (Ia*) to (Id*) or precursors thereof which contain a precursor of the reactive radical, and Z is accordingly a radical of the formula HO—H$_2$C—H$_2$C—, for example. The precursor of the reactive radical is then subsequently converted into the final stage as described above.

The amines of the formulae (Ia*) to (Id*) and their precursors are known, for example from EP-A No. 210,951, or can be prepared analogously thereto.

The reaction (condensation) of the acid chloride of the formula (11) with the abovementioned amines is carried out, for example, in an aqueous, aqueous-organic or organic medium at a temperature between about 0° and 120° C., preferably 10° to 60° C., in the presence of alkaline acid-binding agents, for example alkali metal hydroxides, carbonates or bicarbonates.

The oxidation of the thioether compounds to the sulfones can be carried out by various methods, for example by means of hydrogen peroxide, with or without the addition of tungsten or vanadium compounds as catalysts, and also by means of pereacetic acid, potassium permanganate or chromic acid, or by means of chlorine/hydrochloric acid, in each case in an aqueous, aqueous-organic or organic medium.

The reduction of the nitro group to the amino group is effected in a manner known per se by catalytic hydrogenation with Pd/on-charcoal in ethanol, ethyl acetate or tetrahydrofuran between room temperature and about 40° C. The reduction can also be carried out by means of Fe/hydrochloric acid or Fe/acetic acid in aqueous solution.

The carboxamides which can thus be obtained and in which the grouping —SO$_2$—Z is a β-hydroxyethylsulfonyl group can be converted by treatment with sulfating agents, phosphorylating agents, halogenating agents, alkylsulfonyl or arylsulfonyl halides, alkylcarbonyl or arylcarbonyl halides or alkylcarboxylic or arylcarboxylic anhydrides, into the corresponding dye precursors in which the grouping —SO$_2$—Z is, for example, the grouping —SO$_2$—CH$_2$—CH$_2$—O—SO$_3$H, —SO$_2$—CH$_2$—CH$_2$—O—PO$_3$H$_2$, —SO$_2$—CH$_2$—CH$_2$— halogen, —SO$_2$—CH$_2$—CH$_2$—O—CO—CH$_3$ or —SO$_2$—CH$_2$—CH$_2$—O—CO—C$_6$H$_5$. The products thus obtained can, in turn, be converted by treatment with agents having an alkaline reaction, for example an alkali metal hydroxide or carbonate, such as sodium hydroxide or carbonate, into corresponding compounds in which the grouping —SO$_2$—Z is the grouping —SO$_2$—CH=CH$_2$. The products thus obtained can, in turn, be converted by reaction (addition) with salts of thiosulfuric acid, such as sodium thiosulfate, into compounds in which the grouping —SO$_2$—Z is the grouping —SO$_2$—CH$_2$—CH$_2$—S—SO$_3$H.

Examples of sulfating agents suitable in this connection are concentrated sulfuric acid and chlorosulfonic acid and sulfamic acid or other sulfur trioxide donors. Examples of phosphorylating agents suitable in this connection are concentrated phosphoric acid, pyrophosphoric, metaphosphoric or polyphosphoric acid, alkyl polyphosphates, phosphorus oxychloride or mixtures of phosphoric acid and phosphorus-(V)oxide. Examples of halogenating agents which can be used are thionyl chloride or thionyl bromide.

The following may be mentioned as examples from the large number of possible coupling components K:

Phenol, 1-hydroxy-3-methylbenzene, 1-hydroxy-4-methylbenzene, 1-hydroxybenzene-4-sulfonic acid, 1-hydroxynaphthalene, 2-hydroxynaphthalene, 2-hydroxynaphthalene-6-sulfonic acid or 2-hydroxynaphthalene-7-sulfonic acid, 2-hydroxynaphthalene-3,6-disulfonic acid or 2-hydroxy-naphthalene-6,8-disulfonic acid, 1-hydroxynaphthalene-4-sulfonic acid, 1-hydroxy-naphthalene-4,6-disulfonic acid or 1-hydroxynaphthalene-4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6-sulfonic acid or 1-aminonaphthalene-8-sulfonic acid, 1-amino-2-methoxynaphthalene-6-sulfonic acid, 2-amino-naphthalene-5,7-disulfonic acid, 1-amino-8-hydroxynaphthalene-4-sulfonic acid, 1-amino-8-hydroxynaphthalene-6-sulfonic acid, 1-amino-8-hydroxy-naphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6-disulfonic acid or 1-benzoylamino-8-hydroxynaphthalene-4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or 2-ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6-disulfonic acid or 1-amino-8-hydroxynaphthalene-4,6-disulfonic acid, 1-acetylamino-8-hydroxynaphthalene-3,6-disulfonic acid or 1-acetylamino-8-hydroxynaphthalene-4,6-disulfonic acid, 1-(4'-aminobenzoylamino)-8-hydroxynaphthalene-3,6-disulfonic acid or 1-(4'-aminobenzoylamino)-8-hydroxynaphthalene-4,6-disulfonic acid, 1-(4'-nitrobenzoylamino)-8-hydroxynaphthalene-3,6-disulfonic acid or 1-(4'-nitrobenzoylamino)-8-hydroxynapthalene-4,6-disulfonic acid, 1-(3'-aminobenzoylamino)-8-hydroxynaphthalene-3,6-disulfonic acid, or 1-(3'-aminobenzoylamino)-8-hydroxynaphthalene-4,6-disulfonic acid, 1-(3'-nitrobenzoylamino)-8-hydroxynaphthalene-3,6-disulfonic acid, or 1-(3'-nitrobenzoylamino)-8-hydroxynaphthalene-4,6-disulfonic acid, 2-(4'-amino-3'-sulfophenylamino)-5-hydroxynapthalene-7-sulfonic acid, 3-methyl-5-pyrazolone, 1-phenyl-3-methyl-5-pyrazolone, 1-(4'-sulfophenyl)-3-methyl-5-pyrazolone, 1-(4'- sulfophenyl-5-pyrazolone-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfonaphth-2-yl)-3-methyl-5-pyrazolone, 1-(5',7'-disulfonaphth-2'-yl)-3-methyl-5-pyrazolone, 1-(2',5'-dichloro-4'-sulfophenyl)-3-methyl-5-pyrazolone, 3-aminocarbonyl-4-napthyl-6-hydroxypyrid-2-one, 1-ethyl-3-cyan-4-methyl-6-hydroxypyrid-2-one or 1-ethyl-3-chloro-4-methyl-6-hydroxypyrid-2-one, 1-ethyl-3-sulfomethyl-4-methyl-6-hydroxypyrid-2-one, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridine, 1-ethyl-3-carbamoyl-4methyl-6-hydroxypyrid-2-one, 1-ethyl-3-sulfomethyl-4-methyl-5-carbamoyl-6-hydroxypyrid-2-one, N-acetoacetylaminobenzene, 1-(N-acetoacetylamino)-2-methoxybenzene-5-sulfonic acid, 4-hydroxyquinol-2-one, 1-amino-8-hydroxy-2-(phenylazo)-naphthalene-3,6-disulfonic acid, 1-amino-8-hydroxy-2-(4'-sulfophenylazo)-naphthalene-3,6-disulfonic acid, 1-amino-8-hydroxy-2-(2', 5'-disulfophenylazo)-naphtalene-3,6-disulfonic acid, 1-β-amino-ethyl-3-cyano-4-methyl-6-hydroxypyrid-2-one, 1-γ-aminopropyl-3-sulfomethyl-4-methyl-6-hydroxypyrid-2-one, 1,3-diaminobenzene, 1-amino-3-N,N-di-β-hydroxyethylaminobenzene, 1-amino-3-N,N-di-β-sulfatoethylaminobenzene, 1-amino-3-N,N-di-β-hydroxyethylamino-4-methoxybenzene, 1-amino-3-N,N-di-β-sulfato-ethylamino-4-methoxybenzene, 1-amino-3-sulfobenzylaminobenzene, 1-amino-3-sulfobenzylamino-4-chlorobenzene, 1-amino-3-N,N-disulfobenzylaminobenzene, N,N-di-(β-sulfatoethyl)-aniline, 3-acetylamino-N,N-di-(β-sulfatoethyl)-aniline, 3-methyl-N,N-di-(β-sulfatoethyl)-aniline, N-ethyl-N-(β-hydroxyethyl)aniline, N-ethyl-N-(β-acetoxyethyl)-aniline, 3-acetylamino-N,N-di(β-hydroxyethyl)-aniline, 3-methyl-N,N-di-(β-acetoxyethyl)-aniline, 2-methoxy-5-acetylamino-N-(β-acetoxyethyl)-N-benzylaniline, 2-chloro-5-acetylamino-N-(γ-phenoxy-β-hydroxy-n-propyl)-aniline, 3-ureidoaniline, N-ethyl-N-(3'-sulfobenzyl)-aniline, 3-methyl-N-ethyl-N-(β-sulfatoethyl)-aniline, 3-methyl-N,N-di-(β-hydroxyethyl)-aniline, and 3-methyl-6-methoxy-N,N-di-(β-hydroxyethyl)-aniline.

An additional reactive radical which can be included in K is, in particular, a low-molecular alkanoyl or alkylsulfonyl radical which is substituted by a detachable atom or a detachable group, a low-molecular alkenoyl or alkenesulfonyl radical which is unsubstituted or substituted by a detachable atom or a detachable group, a carbocyclic or heterocyclic radical containing 5-membered or 6-membered rings which is attached via carbonyl or sulfonyl group and substituted by a detachable atom or a detachable group, or a triazine or pyrimidine radical which is attached directly via a carbon atom and is substituted by a detachable atom or a detachable group, or a radical of this type is present in the reactive radical. Examples of reactive radicals of this type which may be mentioned are a six-membered heterocyclic radical which is attached via an amino group and contains halogen atoms, such as a halogenotriazine or halogenopyrimidine radical, or an aliphatic acyl radical, such as a halogenoacetyl or halogenopropionyl radical. Suitable additional reactive radicals are, in particular, triazines. These are, for example, attached to the amino group of H-acid, K-acid, J-acid or γ-acid, of a 3-ureidoaniline or 3-acetylaminoaniline or of a 1-(aminophenyl)-pyrazolone.

If a trihalogenotriazine is used, a halogen atom on the triazine ring can advantageously be replaced by a non-reactive substituent, preferably an amino group, before or after the acylation of an amino group in the diamine. Examples of amines which can be used for this purpose are ammonia, methylamine, ethylamine, β-hydroxyethylamine, N,N-di-β-hydroxyethylamine, β-sulfoethylamine, cyclohexylamine, morpholine, N-methyl-N-phenylamine, N-ethyl-N-phenylamine or benzylamine, or fibre-reactive amines, such as β-(β'-chloroethylsulfonyl)-ethylamine or β-(β'-vinylsulfonylethoxy)-ethylamine, and, in particular, the compounds mentioned later in the text as diazo components. Important triazine substituents are thus the radicals of aniline, o-toluidine, p-toluidine, anisidine, p-chloroaniline, metanilic acid, sulfanilic acid, anthranilic acid, orthanilic acid, 1-naphthylamine, 2-naphthylamine, 2-aminonaphthalene-1-sulfonic acid (Tobias acid), 2-aminonaphthalene-4,8-disulfonic acid (C-acid) and the like, and especially the radicals of diazo components containing fibre-reactive groups, for example 1-amino-4-β-sulfatoethylsulfonylbenzene or 1-amino-3-β-vinylsulfonylethylaminocarbonylbenzene.

If, in addition to the diazo component, according to the invention of the formula (1c), the reactive dyestuff of the formula (2) contains a further diazocomponent, as is the case with a disazo dye of the formula

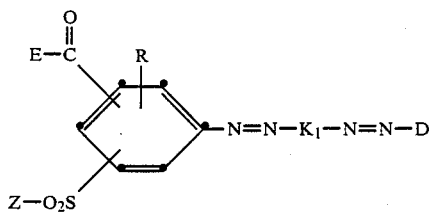

(12)

in which E, R and Z are as defined above, $K_1$ is the radical of a coupling component of the aminonaphtholsulfonic acid series which couples twice, for example the radical of H-acid, K-acid or S-acid, and D is the radical of a diazo component, then D can, for example, be the radical of a customary diazo component of the benzene or naphthalene series which does not contain a fibre-reactive radical, for example aniline; it can, however, also be the radical of a diazo component which contains a reactive radical, for example 1-amino-4-(β-sulfatoethylsulfonyl)-benzene. It is also possible to use as the second diazo component a diaminobenzene, for example 1,3-diaminobenzene-4-sulfonic acid, in which one the two amino groups has been acylated, or is acylated subsequently, so as to be fibre-reactive, for example acylated by means of a halogenotriazine or halogenopyrimidine. The above illustrations also apply analogously to the trisazo dyes or to disazo or tetraazo dyes which are formed from monoazo or disazo compounds by "doubling" via a bridge component.

The following diazo components D which can, as described above, be used together with a component of the formula (1c) are selected for mention below as the most important.

Aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6- methoxybenzene, 1-amino-2-methoxy-4-nitrobenzene, 1-aminobiphenyl, 1-aminobenzene-2-, 3- or -4-carbonic acid, 2-aminodiphenyl ether, 1-aminobenzene-2-, -3- or -4-sulfonamide, 1-aminobenzene-2-, -3- or -4-sulfonic acid, 1-aminobenzene-2,4-disulfonic acid and 1-aminobenzene-2,5-disulfonic acid, 1-amino-4-methylbenzene-2-sulfonic acid, 1-amino-4-methoxybenzene-2-sulfonic acid, 1-amino-4-ethoxybenzene-2-sulfonic acid, 1-amino-3-methylbenzene-6-sulfonic acid, 1-amino-6-methylbenzene-3-sulfonic acid or 1-amino-6-methylbenzene-4-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6-disulfonic acid or 1-aminonaphthalene-5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1-amino-4-β-sulfatoethylsulfonylbenzene, 1-amino-4-vinylsulfonylbenzene, 1-amino-3-vinylsulfonylbenzene, 1-amino-4-β-sulfatoethylsulfonylbenzene-2-sulfonic acid, 1-amino-4-[β-(β'-chloroethylsulfonyl)-ethylaminocarbonyl]-benzene-2-sulfonic acid, 1-amino-4-β-(vinylsulfonyl)-ethylaminocarbonylbenzene-2-sulfonic acid, 1-amino-3-γ-(vinylsulfonyl)-butyrylaminobenzene-6-sulfonic acid, 1-amino-3-vinylsulfonyl-6methoxybenzene, 1-amino-3-β-(vinylsulfonyl)-ethylaminocarbonyl-6-methoxybenzene and 1-amino-3-β-(vinylsulfonyl)-ethylaminocarbonylbenzene; and also diaminobenzenes or diaminonaphthalenes, such as 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 1,4-diaminobenzene-2-carboxylic acid, 1,3-diaminobenzene-4-carboxylic acid, 1-amino-3-aminomethylbenzene-6-sulfonic acid, 1-amino-3-aminomethyl-4-methoxybenzene-2-sulfonic acid, 2,6-diaminonaphthalene-4,8-disulfonic acid, 2-amino-5-aminomethylnaphthalene-1-sulfonic acid and 2-amino-5-aminomethylnaphthalene-1,7-disulfonic acid; instead of a diamine, it is also possible to employ an aminoacetylamino compound, from which the acetyl group is subsequently detached again by saponification, for example 1-acetylamino-3-aminobenzene-4-sulfonic acid or 1-acetylamino-4-aminobenzene-3-sulfonic acid. Suitable reactive components which can be used for the reaction with the second amino group in one of the diamines mentioned are, in particular, aliphatic and heterocyclic compounds which, in addition to a reactive group or a reactive atom, also contain an acyl function, for example α,β-dibromopropionyl chloride, -bromoacryloyl chloride, vinylsulfonylbutyryl chloride and, in particular, halogenopyrimidines and the substituted triazines mentioned in the illustration of coupling K.

The formula (2) according to the invention also embraces dyes of the formula

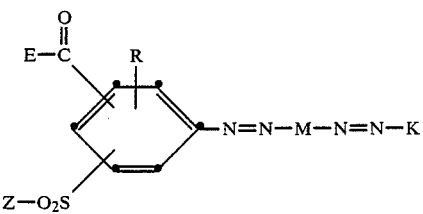

(13)

in which E, Z, R and K are as defined above and M is a central component of the benzene or naphthalene series.

Examples of suitable central components M are benzene or naphthalene derivatives containing an amino group or a radical which can, for example, be converted into an amino group by saponification, for example an acetylamino or benzoylamino group, and which, in addition, are unsubstituted or substituted further by the radicals indicated above for K.

The following are examples of suitable central components M: aniline; m-toluidine; 2,5-dimethyl-aniline or 2,5-dimethoxy-aniline; m-aminoanisole; m-actylaminoaniline, m-propionylaminoaniline, m-butyrylaminoaniline or m-benzoylaminoaniline; m-aminophenylurea; 4-acetamino-2-aminotoluene or 4-acetamino-2-anisole; 2-amino-4-methylanisole; 1-aminonaphthalene-6-sulfonic or 1-aminonaphthalene-7-sulfonic acid; 2-amino-4-acetylaminobenzenesulfonic acid; 2-amino-5-naphthol-7-sulfonic acid; 2-amino-8-naphthol-6-sulfonic acid; 2-(4-aminobenzoylamino)-5-naphthol-7-sulfonic acid; and acetoacetyl-3-sulfo-4-aminoanilide.

A further group of serviceable reactive dyes according to the invention embraces compounds of the formula

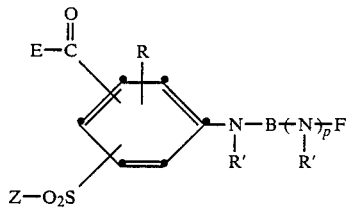

(14)

in which E, Z, R and R' are defined under formula (1) B is a bridge member, F is a radical of a metal-free or metal-containing monoazo or disazo dye containing at least one —SO₃H group, the radical of a 1-aminoanthraquinone or 1-anilinoanthraquinone, the radical of a sulfophthalocyanine dye or the radical of a formazan, phenazine, oxazine or nitroaryl dye and p is 0 or 1.

If p is 0, the bridge member B can, for example, be a direct bond or a —CH₂—, —CO— or —SO₂— group.

If p is 1, B is, for example, a further reactive radical, for example the radical of a carbocyclic or heterocyclic 5-membered or 6-membered ring which is substituted by a detachable atom or a detachable group; examples of radicals suitable in this regard are a halogenopyrimidine radical of the formula

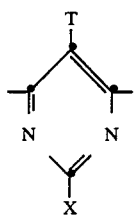

(15a)

in which X is halogen, especially fluorine or chlorine, and T is a negative substituent, for example —SO$_2$—CH$_3$, —CN, —Cl, —F, formyl or nitro, and especially a halogenotriazine radical of the formula

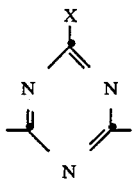

(15b)

in which X is

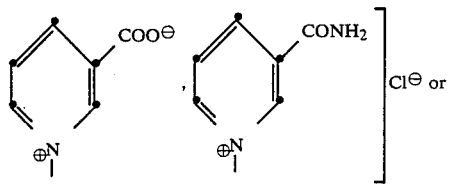

halogen and is preferably fluorine or chlorine;

A preferred subgroup of the reactive dyes according to the invention of the formula (14) embraces compounds of the formula

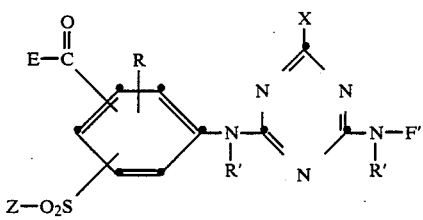

(16)

in which E, X, Z, R and R' are as defined above and F' is a monoazo or disazo dye of the formula $$D-N=N-(M-N=N)_nK- \quad (17a)$$

or $$-D-N=N-(M-N=N-)_nK \quad (17b)$$

in which D, M and K are as defined above and n is 0 or 1.

Compounds which are particularly preferred are those of the formula

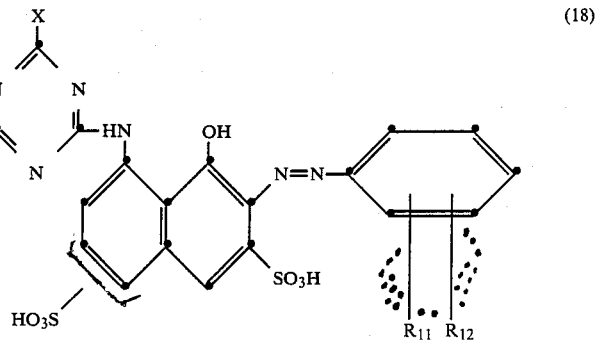

(18)

in which E, Z, R and X are as defined above and $R_{11}$ and $R_{12}$ independently of one another are hydrogen, sulfo or nitro.

A further important group of dyes of the formula (14) embraces those in which F is the radical of a sulfophthalocyanine dye. In this connection F, is for example, a radical of the formula

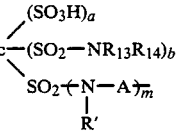

(19)

in which Pc is the radical of a metal-containing or metal-free phthalocyanine nucleus, preferably a copper or nickel phthalocyanine, $R_{13}$ and $R_{14}$ independently of one another are hydrogen or $C_1$-$C_4$alkyl, R' is as defined under the formula (1), A is a $C_2$-$C_6$alkylene radical, for example an ethylene radical or a divalent m-phenylene or p-phenylene radical which is unsubstituted or substituted by, for example, sulfo or —COOH, m is 0 or, if B is a reactive radical, is 1, and a and b are integers or fractional numbers from 1 to 3, a plus b together being 3.0.

A preferred embodiment of the reactive dyes according to the invention of the formula (19) embraces compounds of the formula

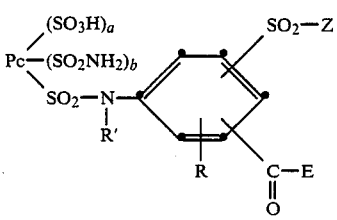

(20)

in which Pc, E, R, R', Z, a and b are each as defined above.

Further preferred subgroups of the dyes according to the invention of the formula (14) are:
Anthraquinone compounds of the formula

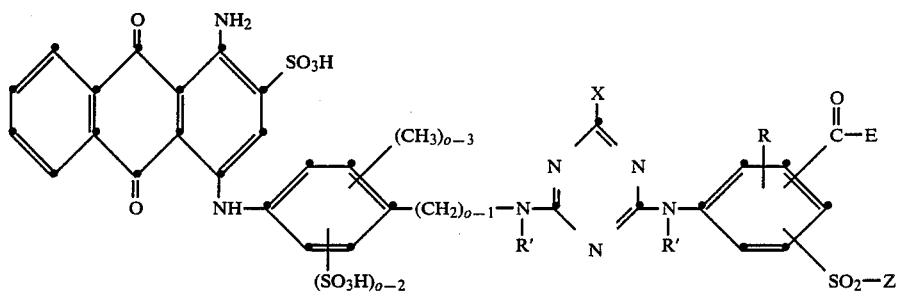
(21)

in which E, R, R', X and each as defined above, and formazan compounds of the formula

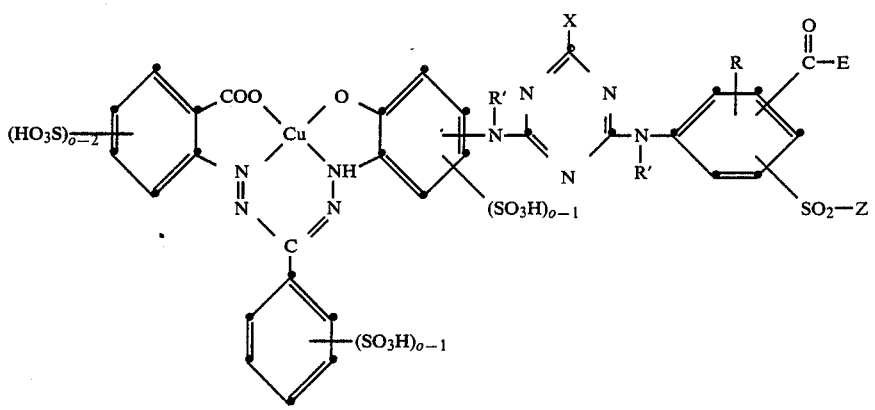
(22)

in which E, R, R', X and Z are each as defined above.

Compounds of the formula (14) in which p is 0 can, for example, be prepared by reacting a compound of the formula F—B—Hal    (23)

in which F and B are as defined above and Hal is halogen, especially chlorine, or dye precursors, with a compound of the formula

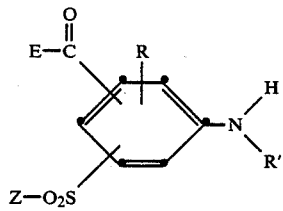
(1)

in which E, Z, R and R' are each as defined above.

The compounds of the formula (23) are known or can be prepared in a manner known per se.

The reaction is carried out, for example, in an aqueous, aqueousorganic or organic medium at a temperature of, for example, 0° to 100° C., preferably 10°-70° C.; in the course of this it is preferable to keep the pH of the reaction solution neutral to slightly acid by the addition of a base, for example sodium carbonate or bicarbonate.

Compounds of the formula (14) in which p is 1 can, for example, be prepared by reacting an organic dye of the formula (24)

in which F and R' are as defined above, or dye precursors, first with a compound of the formula Hal—B—Hal    (25)

in which B is as defined above and Hal is halogen, especially chlorine or fluorine, to give the compound of the formula

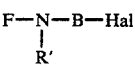
(26)

and subsequently reacting this compound with a compound of the formula (1) indicated above to give the reactive dye of the formula (14).

The compounds of the formula (24) are known or can be prepared in a manner known per se.

The compounds of the formula (25) are also known per se; examples of suitable compounds of the formula (25) are trihalogenopyrimidines or tetrahalogenopyrimidines, for example 2,4,6-trifluoro-5-methylsulfonylpyrimidine, 2,4,6-trichloro-5-methylsulfonylpyrimidine or 2,4,6-trifluoro-5-chloropyrimidine and particularly trihalogenotriazines, such as 2,4,6-trichlorotriazine or 2,4,6-trifluorotriazine.

The preparation of the dyes of the formula (26) and of the reactive dyes according to the invention of the formula (14) can also be combined with one another in an advantageous manner by first reacting a dye of the formula (24) with a compound of the formula (25) to give the dye of the formula (26) and then reacting the latter, without isolating the dye of the formula (26), with an amine of the formula (1) to give a reactive dye according to the invention of the formula(14). The reaction of the dyes of the formula (24) with the compounds of the formula (25) is advantageously carried out at low temperatures, for instance between −2° and +10° C., preferably between 0° and 5° C., with the addition of acid-binding agents, such as sodium hydroxide, sodium carbonate or sodium bicarbonate, in a pH range between 1.5 and 9, preferably between 4 and 6.

The solvent used is preferably water containing a certain proportion of organic solvents, for example acetone. The reaction can, however, also be carried out in water alone.

For the further reaction of the dyes of the formula (26) thus obtained with the amines of the formula (1), it is advantageous to employ the amines in the form of a salt, preferably in the form of the hydrochloride. The reaction is carried out at an elevated temperature, for instance between 5° and 70° C., preferably between 5° and 30° C., with the addition of acid-binding agents, preferably sodium bicarbonate, in a pH range from 2 to 8, preferably 3.5 to 7.5.

If the dye radical F is composed of a plurality of components, as is the case, for example, with azo dyes or formazan dyes, the dyes according to the invention of the formula (14) can also be obtained by synthesizing them in a manner known per se from components of F, one of which contains a group of the formula

in which R′, B and Hal are as defined above.

Components of this type are obtained by acylating the corresponding components containing an —NHR′ group with a compound of the formula (25) under conditions corresponding to those described above for the corresponding reaction of the dye. The dyes thus obtained are then reacted in the manner described above with an amine of the formula (1) to give a dye according to the invention of the formula (14).

The reactive dyes according to the invention, which contain the radical of an amine of the formula (1), are suitable for dyeing and printing a very wide variety of materials, such as silk, leather, wool, polyamide fibres and especially cellulose-containing fibre materials of all kinds. Examples of such fibre materials are the natural cellulose fibres, such cotton, linen and hemp, and cellulose and regenerated cellulose. The reactive dyes according to the invention are also suitable for dyeing or printing fibres which contain hydroxyl groups and are present in mixed fabrics, for example mixtures of cotton with polyester fibres or polyamide fibres.

The dyes according to the invention can be applied to the fibre material and fixed on the fibre in various ways, particularly in the form of aqueous dye solutions and printing pastes. They are suitable both for the exhaustion process and for dyeing by the pad-dyeing process, in which the goods are impregnated with aqueous dye solutions, which can contain salts, and, after an alkali treatment or in the presence of alkali, the dyes are fixed, if appropriate by the application of heat. They are particularly suitable for the so-called cold pad-batch process, in which the dye is applied, together with the alkali, to the padder and is then fixed by being stored for several hours at room temperature. After being fixed, the dyeings or prints are thoroughly rinsed with cold and hot water, if appropriate with the addition of an agent which has a dispersing effect and promotes the diffusion of the non-fixed portions.

The reactive dyes according to the invention are distinguished by a high reactivity, good fixability and a good build-up capacity. They can therefore be employed by the exhaustion dyeing process at low dyeing temperatures and, in the pad-steam process, require only short steaming times. The degrees of fixation are high, and the non-fixed portions can be easily washed out, the difference between degree of exhaustion and degree of fixation being remarkably small, i.e. the hydrolysis loss is very small. The reactive dyes according to the invention are also particularly suitable for printing, particularly on cotton, but also for printing nitrogen-containing fibres, for example wool or silk or mixed fabrics containing wool or silk.

The dyeings and prints on cellulose fibre materials produced by means of the dyes according to the invention possess a high tinctorial strength and a high stability of the fibre-dye bond, both in the acid range and in the alkaline range, and also good fastness to light and very good fastness properties to wet processing, such as fastness to washing, water, seawater, cross-dyeing and perspiration, and also good fastness to pleating, ironing and rubbing.

The following examples serve to illustrate the invention. The temperatures are quoted in degrees centigrade, parts are parts by weight and the percentages relate to percentages by weight, unless a note is made to the contrary. The ratio of parts by weight to parts by volume is that of kilograms to liters.

Preparation of the intermediates of the formula (1)

Example 1

A solution of 110 g of 2-chloro-5-nitrobenzoyl chloride in 250 ml of toluene is added dropwise, at a temperature of 15°–20° C. and with vigorous stirring, to a mixture consisting of 61 g of 2-amino-2′-hydroxydiethyl sulfide, 100 ml of toluene and 400 ml of water, the pH being controlled meanwhile by the addition of sodium hydroxide solution so that it does not fall below a value of 8.5–9.0. The pH is then adjusted with hydrochloric acid to a value of 7.0, and the toluene and some of the water is removed by evaporation in vacuo. The residue is suspended in approx. 400 ml of water, and the pH is adjusted to 9 with sodium carbonate. The product is then filtered off with suction, washed with water until neutral and dried. The compound of the formula

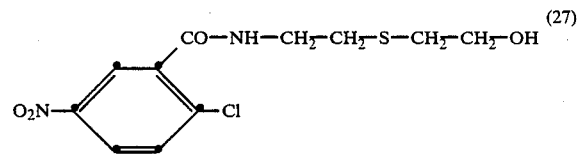

is obtained in the form of a pale yellow powder.

Example 2

A mixture consisting of 91.5 g of the compound of the formula (27) according to Example 1, 60 ml of dimethylformamide, 25.8 g of 2-mercaptoethanol and 26.55 g of sodium bicarbonate is stirred for 7 hours at a temperature of 78°–80° C. After cooling, the reaction mixture is diluted with 500 ml of 20% ethanol and the precipitated product is then filtered off with suction. The product is washed, first with 20% ethanol and then with water; the compound of the formula

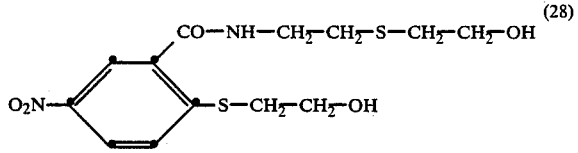
(28)

is obtained in the form of moist crude material.

Example 3

0.2 g of tungstic acid is suspended in 40 ml of water, the pH of the mixture is adjusted to a value of 11–12 with sodium hydroxide solution, and the mixture is then stirred until a cloudy solution is formed. The pH of the solution is adjusted to a value of 6.0 with acetic acid and 34.7 g of the compound of the formula (28) according to Example 2 are added in the form of moist crude material. The mixture is heated to 80°–85° C., and 6.8 g of hydrogen peroxide, in the form of a 35% aqueous solution, are added dropwise at this temperature. The temperature is then raised to 93°–95° C. and a further 7.4 g of hydrogen peroxide in the form of 35% solution are added dropwise. The mixture is then heated under reflux for 30 minutes and, if necessary, a little more H$_2$O$_2$ is added, so that finally there is a slight excess of hydrogen peroxide in the reaction mixture.

The product precipitated after cooling is filtered off with suction, washed with water and dried. The product of the formula

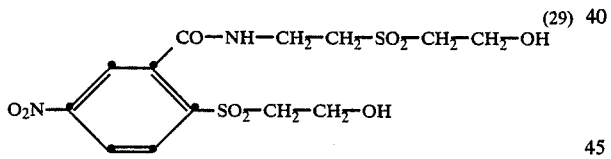
(29)

is obtained in the form of a yellowish powder, melting point 153° C., after recrystallization from water.

Example 4

A mixture consisting of 82 g of the compound of the formula (29) according to Example 3, 4 g of 5% palladium-on-charcoal catalyst and 460 ml of water is subjected to catalytic hydrogenation at a temperature of 50°–60° C. until the theoretical amount of hydrogen has been absorbed. After the removal of the catalyst by filtration, an aqueous solution of the compound of the formula

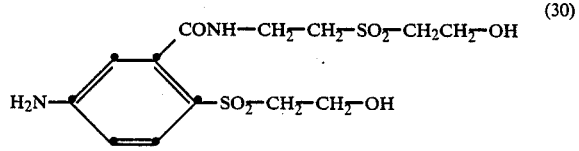
(30)

is obtained; this can be used without further treatment for further reactions, for example for diazotization.

Example 5

70 g of chlorosulfonic acid are added at a temperature of 20°–40° C. to a mixture consisting of 41 g of the compound of the formula (29) according to Example 3 and 200 ml of dimethylformamide. The mixture is stirred at 40°–45° C. for 4 hours and is then poured onto ice and diluted with water, and the pH is adjusted to a value of 5 with sodium bicarbonate. First the water and then the dimethylformamide are then removed by evaporation in vacuo. The salt-containing residue, which contains the sodium salt of the compound of the formula

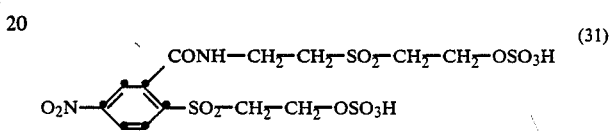
(31)

is taken up in 200 ml of water, and 2 g of 5% palladium-on-charcoal are added. The mixture is subjected to catalytic hydrogenation at 30°–40° C. until the theoretical amount of hydrogen has been absorbed. After the removal of the catalyst, an aqueous solution of the compound of the formula

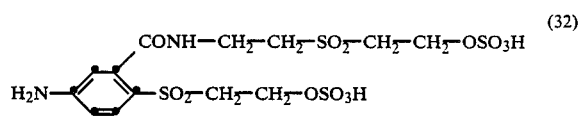
(32)

is obtained; this can be used without further treatment for further reactions, for example for diazotization.

Preparation of the dyes

Example 6

10 ml of 4N sodium nitrite solution are added, at a temperature of 0°–2° C., to a mixture consisting of 0.04 mol of the compound of the formula (30) according to Example 4 (present in the form of sodium salt), 80 ml of water and 12 ml of concentrated hydrochloric acid, and the mixture is stirred at the same temperature until diazotization is complete. A slight excess of nitrite is destroyed with sulfamic acid.

The solution of the diazonium salt is added to a mixture consisting of 9.15 g of N,N-di-(2-hydroxyethyl)-3-chloroaniline, 50 ml of water and 2.5 ml of concentrated hydrochloric acid, and the whole mixture is stirred at a temperature of 0°–2° C. (duration approx. 3 hours); in the course of this, the pH is gradually raised to a value of 3.5 by adding sodium acetate. After the mixture has been warmed to room temperature, the pH is adjusted to a value of 6 with sodium hydroxide solution, and the product is then filtered off with suction and dried in vacuo. The compound of the formula

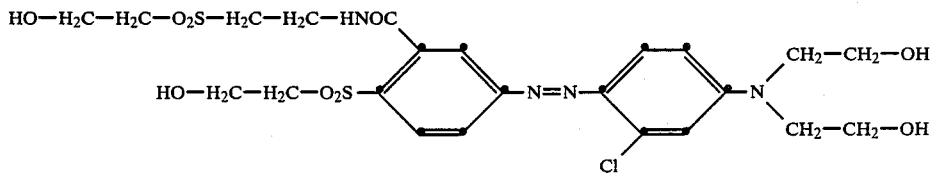

is obtained as an orange-coloured powder which dissolves in organic solvents to form an orange colour.

For conversion into the sulfato ester, 18.2 g of the above compound are stirred with 60 ml of dimethylformamide, 20.9 g of chlorosulfonic acid are added at a temperature of 20°–40° C., and this mixture is stirred for 4 hours at 40°–42° C.

The mixture is then poured into ice water, the pH is adjusted to a value of 5 with sodium bicarbonate and the water and the dimethylformamide are then removed by vacuum distallation. The residue is taken up in a little water and subjected to dialysis. The dye solution of low salt content thus obtained is evaporated to dryness at 40° C. in vacuo, whereby the compound of the formula

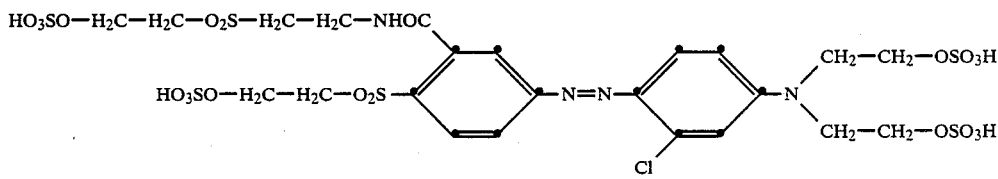

is obtained, in the form of the sodium salt, as an orange powder.

High fixation yields are obtained when the dye is applied to cotton as a reactive dye by the dyeing processes customary for vinyl sulfone dyes; the orange dyeings obtained exhibit good fastness properties.

The same dye is obtained if the compound of the formula (32) according to Example 5 is diazotized in a manner known per se and coupled with the compound of the formula

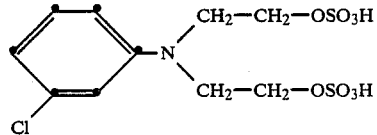

Example 7

A solution of 54 g of the compound of the formula (32) according to Example 5 is diazotized in hydrochloric acid and the product is added at 0° to 5° C. and at pH 5–6 to an aqueous solution containing 28.4 g of 1-(4-sulfophenyl)-3-carboxy-5-pyrazolone, and coupling is carried out; the compound of the formula

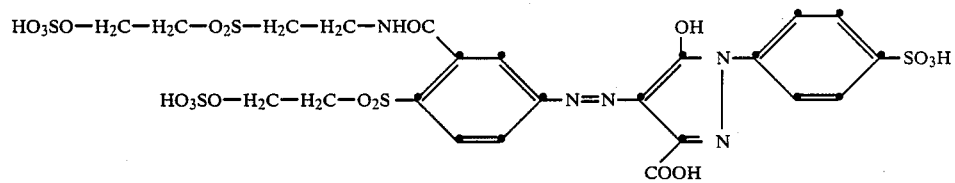

is then isolated in a manner known per se. Yellow dyeings having good fastness properties are obtained, at high fixation yields, when the dye is applied to cotton by the dyeing process customary for vinyl sulfone dyes.

Examples 8–13

The procedure described in Example 7 is repeated, but using the coupling components mentioned in Table 1 instead of 1-(4-sulfophenyl)-3-carboxy-5-pyrazolone. Analogous compounds which have the shade indicated in the Table and which also produce dyeings having good fastness properties at high fixation values on cellulose fibres are obtained.

TABLE 1

| Example No. | Coupling component | Shade on cotton |
|---|---|---|
| 8 | 1-ethyl-3-cyano(?)-... pyridone: HO–C=CH–C(CH$_3$)=C(CH$_2$SO$_3$H)–C(=O)–N(CH$_2$CH$_3$)– (arrow indicates coupling position on the CH between HO–C and C–CH$_3$) | yellow |
| 9 | benzene ring with SO$_3$H, NH$_2$, NHCOCH$_3$ substituents (arrow on ring) | golden-yellow |
| 10 | benzene ring with CF$_3$ and –N(CH$_2$–CH$_2$–OSO$_3$H)$_2$ (arrow on ring) | orange |
| 11 | benzene ring with –N(CH$_2$–CH$_2$–OSO$_3$H)$_2$ (arrow on ring) | orange |
| 12 | benzene ring with CH$_3$ and –N(CH$_2$–CH$_2$–OSO$_3$H)$_2$ (arrow on ring) | orange |
| 13 | benzene ring with NHCOCH$_3$ and –N(CH$_2$–CH$_2$–OSO$_3$H)(CH$_3$–CH$_2$–OSO$_3$H) (arrow on ring) | red |

Example 14

54 g of the compound of the formula (32) according to Example 5 are diazotized in a known manner in a hydrochloric acid medium at 0°–2° C. by adding 25 ml of 4N sodium nitrite solution. The diazonium salt solution is added to a solution of 10.7 g of 3-methylaniline in 60 ml of water, after which coupling is carried out, first in a strongly acid range and later, after sodium bicarbonate has been added, in the range of pH 3–4. When coupling is complete, the pH of the reaction mixture is adjusted to a value of 6.5, 25 ml of 4N sodium nitrite solution are added and the mixture is poured slowly into a mixture consisting of 300 g of ice and 30 ml of 37% hydrochloric acid. The reaction mixture is stirred for approx. 3 hours at 3°–5° C. and the excess of nitrite is then destroyed with sulfamic acid. A solution of 41.9 g of the disodium salt of N,N-di-(2-sulfatoethyl)-3-chloroaniline in 150 ml of water is then added and coupling is carried out, first in a strongly acid range and then, after sodium bicarbonate has been added, at pH 4–5. When coupling is complete, the pH of the reaction mixture is adjusted to a value of 5.5 and the resulting dye is isolated by salting out with potassium chloride. After being dried, the dye of the formula

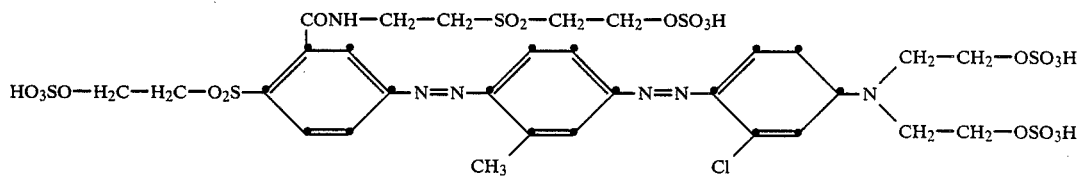

is obtained, in the form of its potassium salt, as a dark brown powder. The brown dyeings which can be obtained with the dye on cellulose fibres exhibit good fastness properties.

Example 15

The procedure described in Example 14 is repeated, using an equivalent amount of 2-methoxy-5-methylaniline instead of 3-methylaniline. This gives the dye of the formula

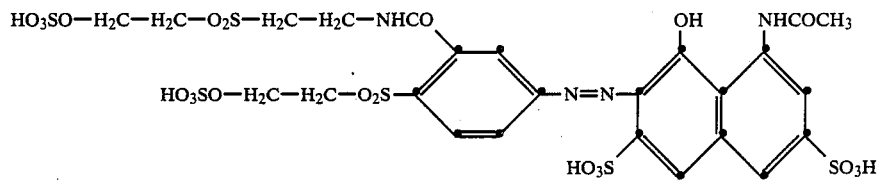

which, when applied to cellulose fibres, also produces brown dyeings having good fastness properties.

Example 16

The procedure described in Example 14 is repeated, using an equivalent amount of 1-naphthylamine-7-sulfonic acid instead of 3-methylaniline. This gives the dye of the formula

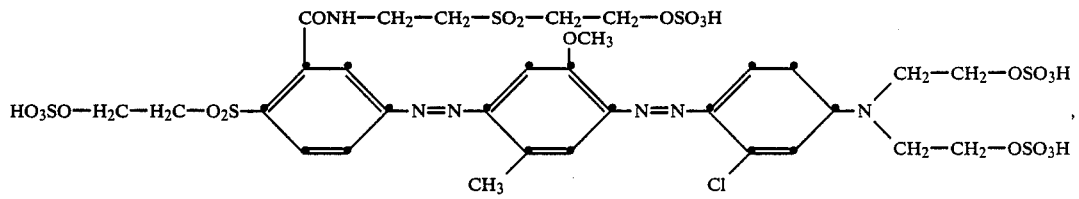

which, when applied to cellulose fibres, produces brown dyeings having good fastness properties.

Example 17

54 g of the compound of the formula (32) according to Example 5 are diazotized in a known manner in a hydrochloric acid medium at 0°–2° C. by adding 25 ml of 4N sodium nitrite solution. The diazonium salt solution is then added at 0°–5° C. to a solution of 38 g of 1-acetylamino-8-naphthol-3,6-disulfonic acid in 200 ml of water, and the pH of the reaction mixture is controlled at a value of 3.5–4.0 with sodium acetate. When coupling is complete the pH is adjusted to 5.5 and the resulting dye of the formula

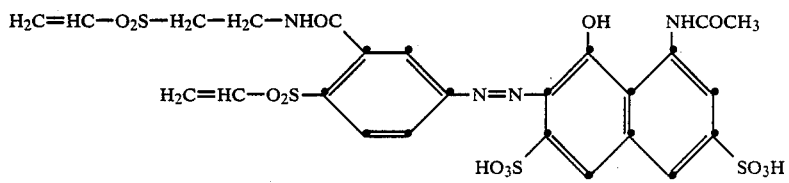

is isolated in the form of the sodium salt. When applied to cellulose fibres, the dye produces red dyeings having good fastness properties.

If, when coupling is complete, the dye solution is stirred for 10 minutes at 40° C. and at pH 9–10, and the dye is then isolated at pH 5.5, the dye of the formula

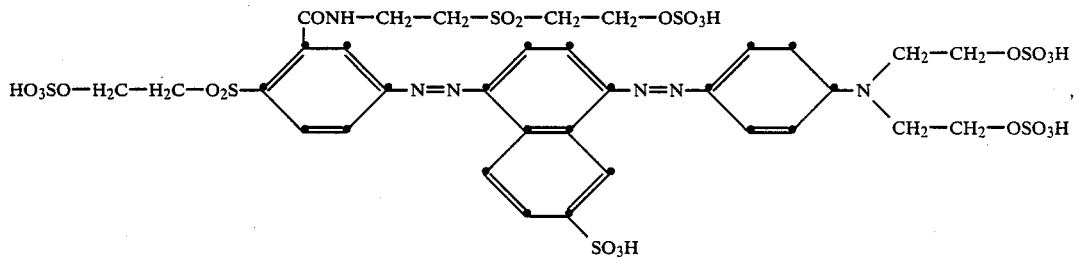

is obtained, which has good properties similar to those of the dye described above.

Examples 18–36

The procedure described in Example 17 is repeated, using the coupling components mentioned in Table 2 instead of 1-acetylamino-8-naphthol-3,6-disulfonic acid. Analogous dyes having the shade listed in the Table are obtained.

TABLE 2

| Example No. | Coupling component | Shade on cotton |
|---|---|---|
| 18 | 1-hydroxy-8-acetylamino-3,6-disulfo-naphthalene (OH, NHCOCH₃, HO₃S, SO₃H substituents; coupling position indicated by arrow) | red |
| 19 | 1-hydroxy-8-benzoylamino-3,6-disulfo-naphthalene (OH, NHCO-C₆H₅, HO₃S, SO₃H) | bluish-tinged red |
| 20 | 1-hydroxy-8-[(4-chloro-6-(3-sulfophenylamino)-1,3,5-triazin-2-yl)amino]-3,6-disulfo-naphthalene | bluish-tinged red |
| 21 | 1-hydroxy-8-propionylamino-3,5-disulfo-naphthalene (OH, NH—COCH₂CH₃, HO₃S, SO₃H) | red |
| 22 | 1-hydroxy-8-(5-vinylsulfonyl-pentanoylamino)-3,5-disulfo-naphthalene (OH, NH—CO(CH₂)₃SO₂CH=CH₂, HO₃S, SO₃H) | red |
| 23 | 1-hydroxy-8-[(4-chloro-6-(1-isopropoxyethylidene)-amino-1,3,5-triazin-2-yl)amino]-3,6-disulfo-naphthalene | bluish-tinged red |

TABLE 2-continued
| Example No. | Coupling component | Shade on cotton |
|---|---|---|
| 24 | 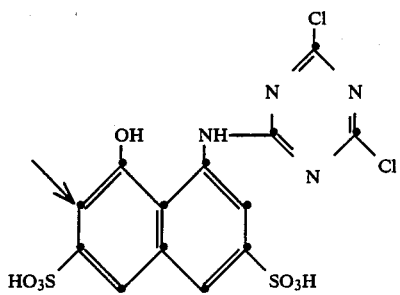 | bluish-tinged red |
| 25 | 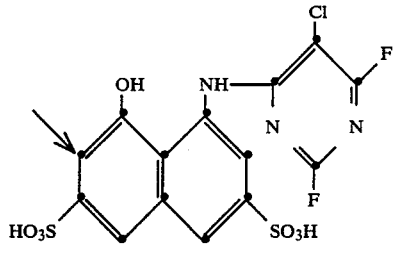 | bluish-tinged red |
| 26 | 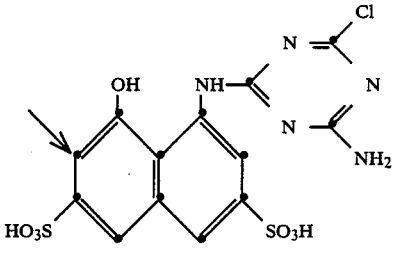 | bluish-tinged red |
| 27 | 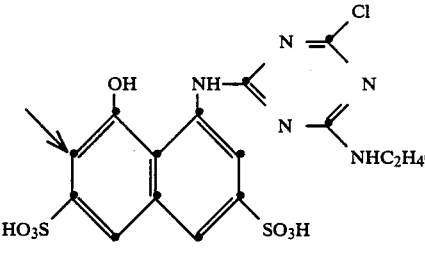 | bluish-tinged red |
| 28 | 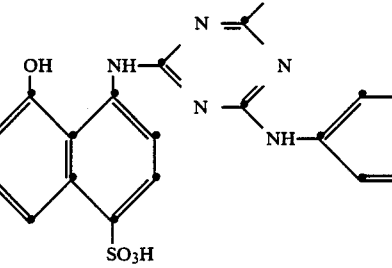 | bluish-tinged red |

TABLE 2-continued

| Example No. | Coupling component | Shade on cotton |
|---|---|---|
| 29 | (structure) | red |
| 30 | (structure) | red |
| 31 | (structure) | bluish-tinged red |
| 32 | (structure) | bluish-tinged red |
| 33 | (structure) | bluish-tinged red |
| 34 | (structure) | bluish-tinged red |

TABLE 2-continued

| Example No. | Coupling component | Shade on cotton |
|---|---|---|
| 35 | 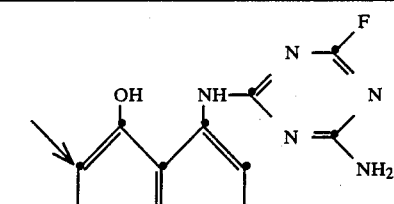 | bluish-tinged red |
| 36 | 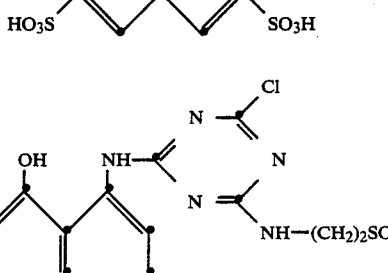 | bluish-tinged red |

Example 37

135 parts of the compound of the formula (32) according to Example 5 are introduced into 400 parts of water and dissolved, at a pH of 5.3 to 6.0 and at 20° to 22° C., in the course of one hour by means of sodium bicarbonate. 54 parts by volume of 31% aqueous hydrochloric acid and 225 parts of ice are then added in order to render the solution acid to Congo and to bring it to a temperature of 0° to 5° C. Diazotization is carried out at this temperature by means of 32.75 parts by volume of 40% aqueous sodium nitrite solution. A slight excess of nitrous acid is then destroyed with 0.5 part of sulfamic acid. 77.8 parts of 1-amino-8-hydroxynaphthalene-3,6-disulfonic acid are then added, and the mixture is stirred for 4 to 5 hours at a temperature between 4° and 8° C. and at a pH between 1 and 2. After this reaction time, the pH is adjusted to a value of 6.0 with sodium carbonate.

In a separate batch, 62 parts of 3-aminoacetanilide-4-sulfonic acid are diazotized analogously to the instructions above. The resulting diazonium suspension is added to the solution of the monoazo compound which has been prepared. The pH is kept at a value of 6 to 7, and the reaction mixture is stirred for a further 3 hours. The disazo compound prepared is isolated by evaporating the reaction mixture, if necessary after clarification by filtration.

A black powder containing electrolyte and containing the sodium compound of the formula

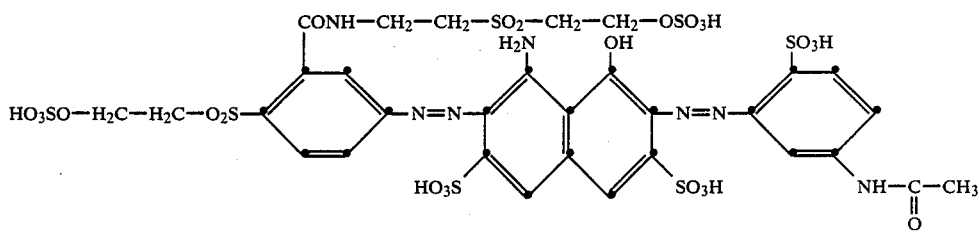

is obtained; this is very suitable as a dye for dyeing cellulose fibre materials by the known dyeing and printing methods and customary fixing methods, customary in the industry, for fibre-reactive dyes; on these materials it produces navy blue colour shades having good fastness properties.

If, when coupling is complete, the dye solution is stirred for 30 minutes at room temperature and at pH 9–10 and if the pH is then reduced to a value of 5.0 with hydrochloric acid, spray drying gives the dye of the formula

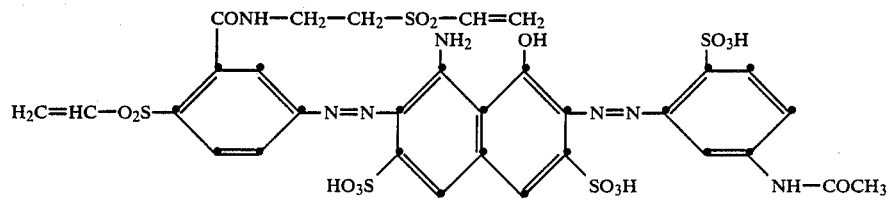
which dyes cellulose fibres in navy blue colour shades having good fastness properties.
Examples 38–53
The dyes mentioned in Table 3, each of which dyes cotton in a navy blue shade, can be prepared analogously to Example 37.
TABLE 3
| Ex. No. | Dye |
|---|---|
| 38 | |
| 39 | |
| 40 | |
| 41 | |
| 42 | |

TABLE 3-continued

| Ex. No. | Dye |
|---|---|
| 43 | (structure) |
| 44 | (structure) |
| 45 | (structure) |
| 46 | (structure) |
| 47 | (structure) |
| 48 | (structure) |

TABLE 3-continued
| Ex. No. | Dye |
|---|---|
| 49 | 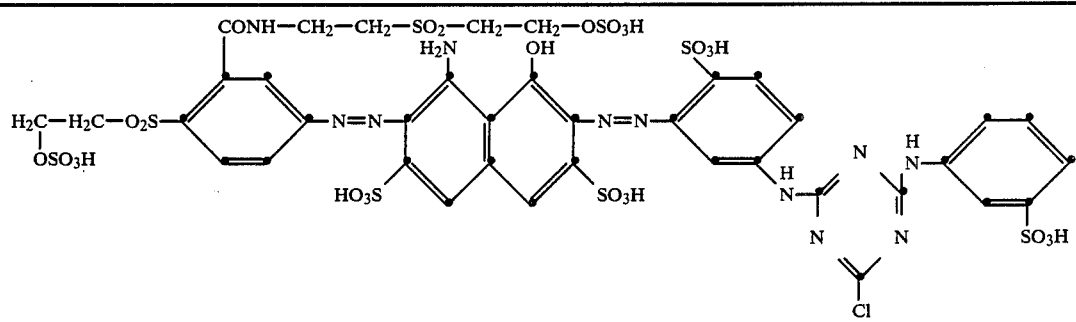 |
| 50 | 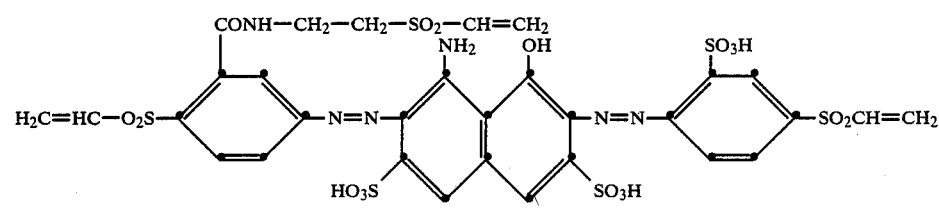 |
| 51 | 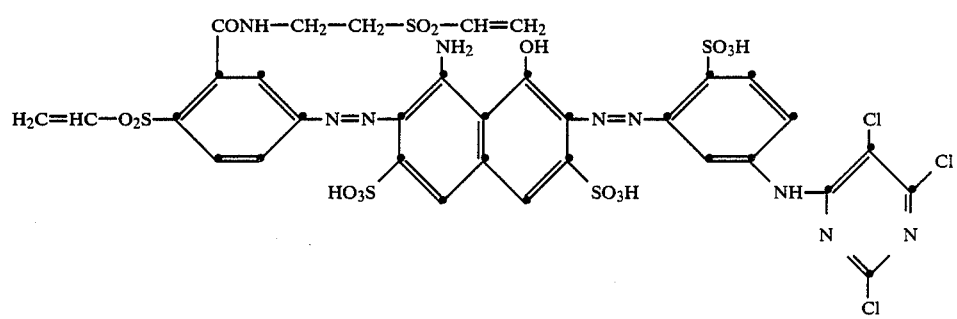 |
| 52 | 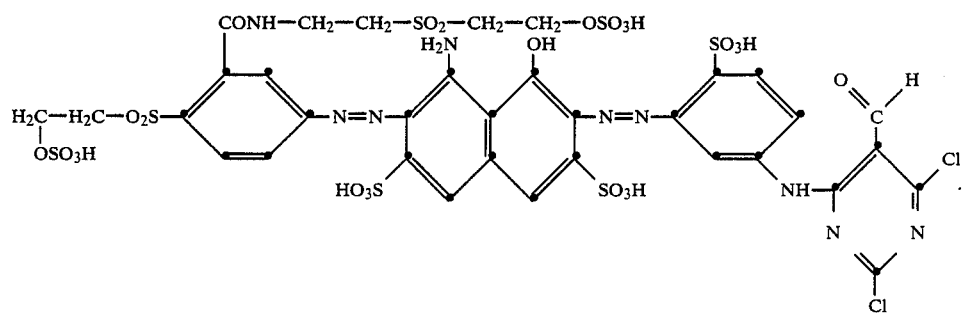 |
| 53 | 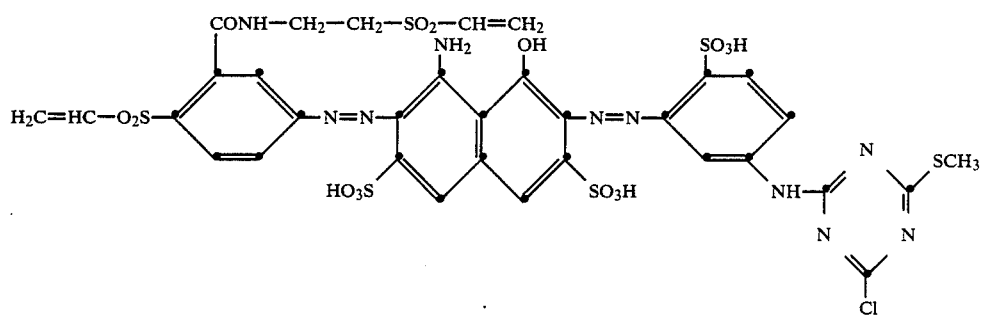 |
Example 54
16 parts of 1-amino-8-hydroxynaphthalene-3,6-disulfonic acid are dissolved in 400 parts of water under neutral conditions. The pH of the reaction solution is adjusted to a value of 4.5 and 7.0 parts of cyanuric fluoride are added dropwise at 0° to 3° C. and with good stirring. The hydrogen fluoride liberated thereby is neutralized by the metered addition of 2N sodium hydroxide solution. As soon as free 1-amino-8-hydroxynaphthalene-3,6-disulfonic acid can no longer be detected, 27 parts of the compound of the formula (32) according to Example 5 in 50 parts of water are added. The temperature is raised to 20° to 25° C. and the pH of the reaction solution is kept at a value of 4 to 6.5. When the condensation reaction is complete, the dye intermediate is coupled at 0° to 10 ° C. with 15 parts of diazotized 2-aminonaphthalene-1,5-disulfonic acid. The reaction mixture is then stirred for 30 minutes at pH 10 and at room temperature. The pH is then reduced to a value of 7.0–7.5 with hydrochloric acid. After salting out with KCl the dye of the formula

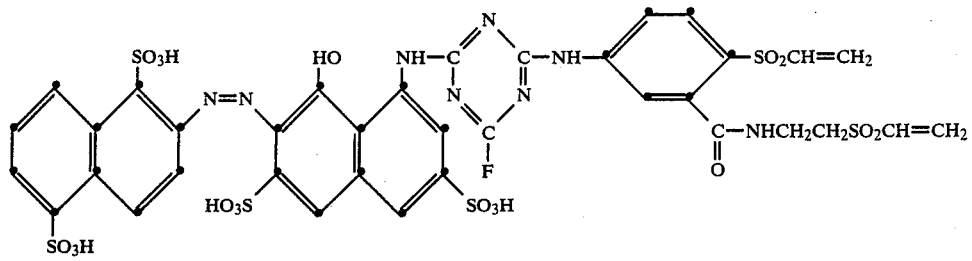

is isolated in the form of a dark red powder which dyes cotton in bluish-tinged red shades having good fastness properties.

Examples 55–67

The dye mentioned in Table 4, which dye cotton in the particular shade mentioned, can be prepared analogously to Example 54.

TABLE 4
| Example No. | Dye | Shade on cotton |
|---|---|---|
| 55 | 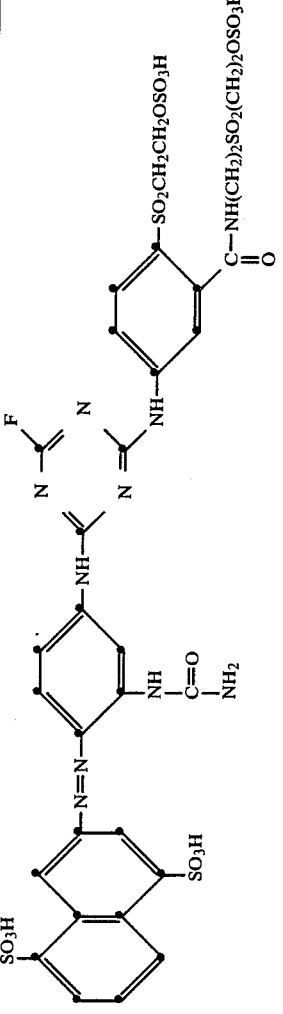 | golden-yellow |
| 56 | 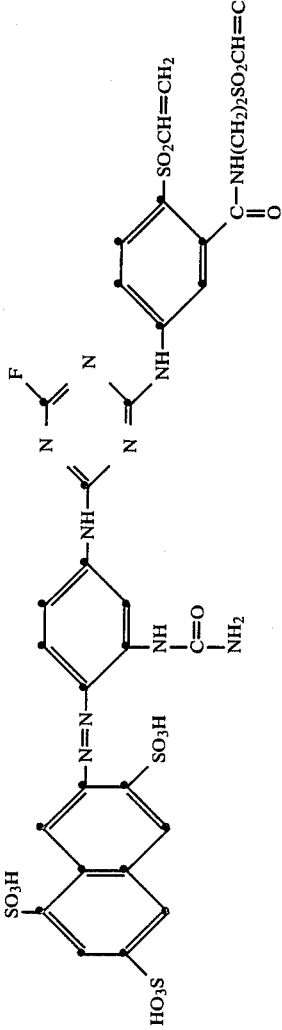 | golden-yellow |
| 57 | 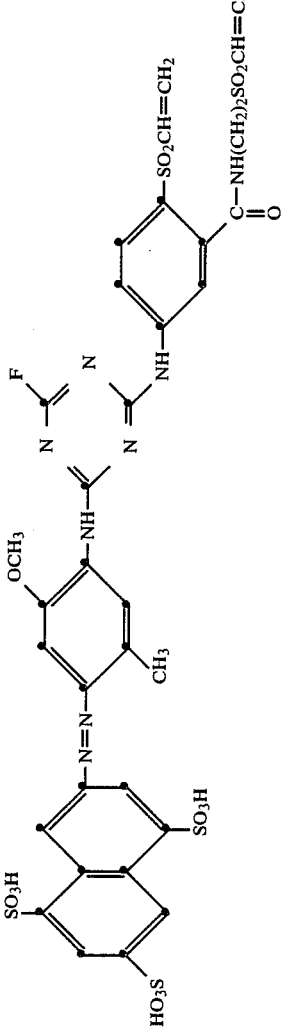 | golden-yellow |
| 58 | 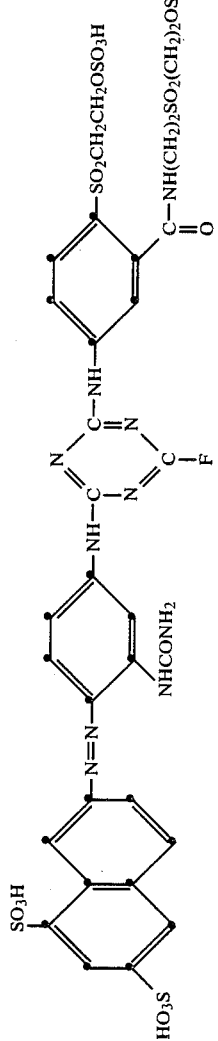 | golden-yellow |

TABLE 4-continued
| Example No. | Dye | Shade on cotton |
|---|---|---|
| 59 | 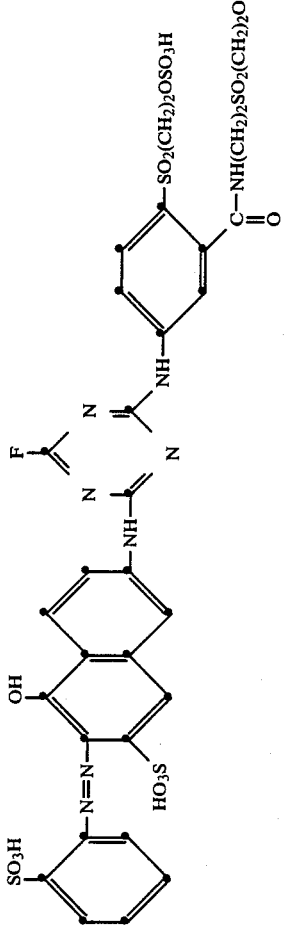 | orange |
| 60 | 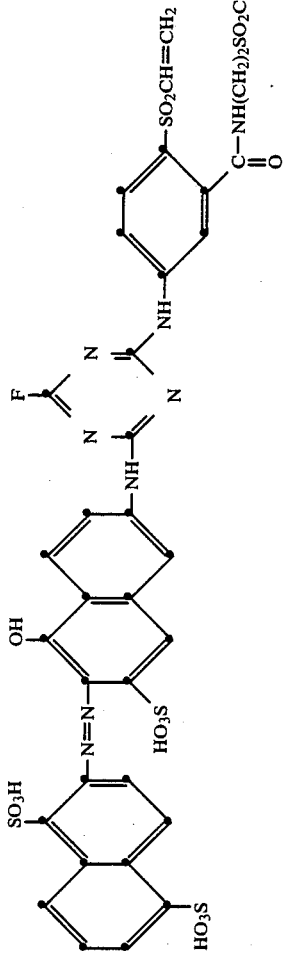 | orange |
| 61 | 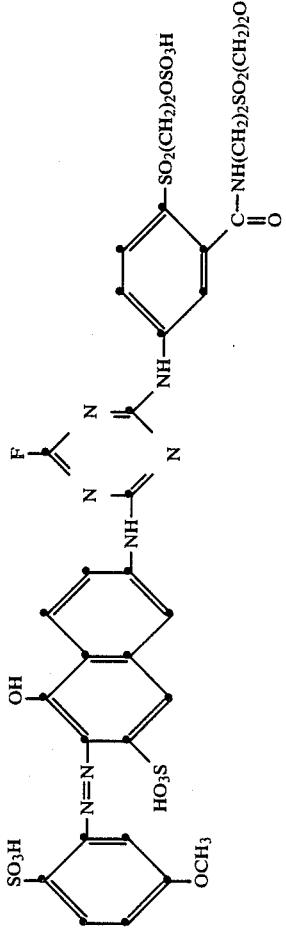 | Scarlet |

TABLE 4-continued
| Example No. | Dye | Shade on cotton |
|---|---|---|
| 62 | 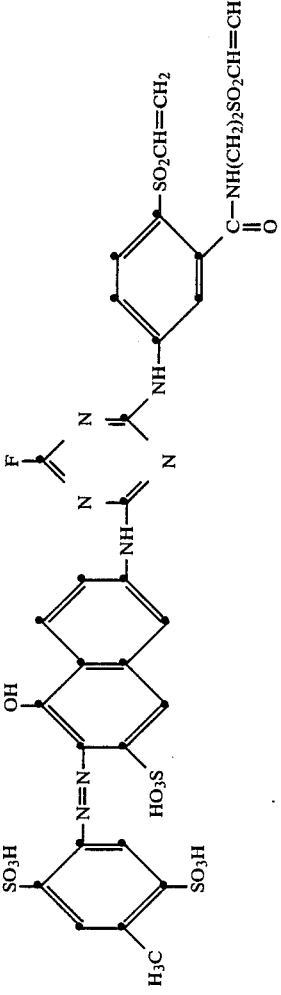 | orange |
| 63 | 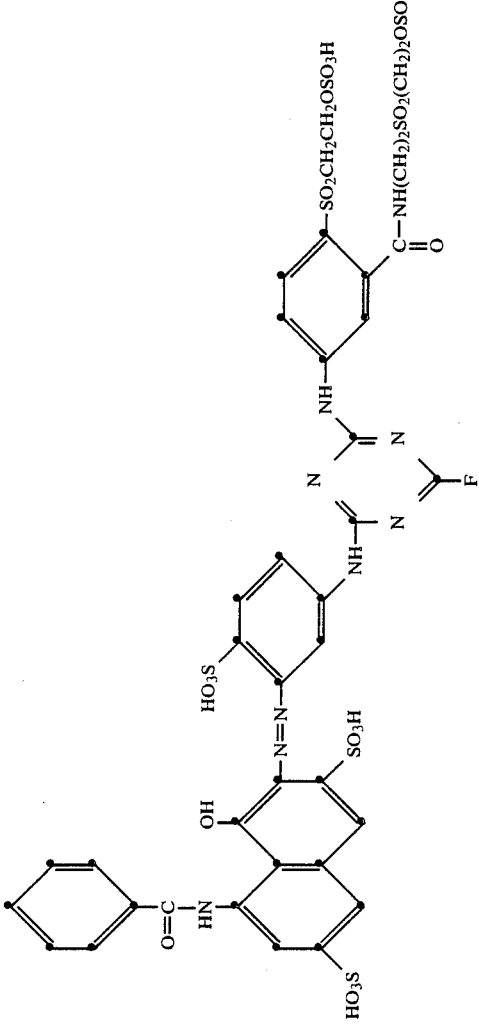 | red |

TABLE 4-continued

| Example No. | Dye | Shade on cotton |
|---|---|---|
| 64 | (structure) | red |
| 65 | (structure) | red |
| 66 | (structure) | bluish-tinged red |

TABLE 4-continued

| Example No. | Dye | Shade on cotton |
|---|---|---|
| 67 | (complex azo dye structure with SO₃H, HO₃S, N=N, naphthalene rings, NH-triazine with F, NH-phenyl bearing SO₂CH₂CH₂OSO₃H and C(=O)-NH(CH₂)₂SO₂(CH₂)₂OSO₃H substituents) | bluish-tinged red |

Example 68

95 parts of cyanuric chloride are reacted in a known manner with 1-amino-8-hydroxynaphthalene-3,6-disulfonic acid in water. A freshly diazotized solution of 1-aminobenzene-2-sulfonic acid is added to this product, and the pH is adjusted to a value of 4–4.5. When coupling is complete, 270 parts of the compound of the formula (32) according to Example 5, dissolved in 800 parts of water, are added and are reacted at pH 7–7.5 and at 35° C. The solution is then stirred for 30 minutes at pH 10 and at room temperature. The pH is reduced to a value of 6.5–7.0 with hydrochloric acid. Salting with KCl gives 500 parts of the dye of the formula

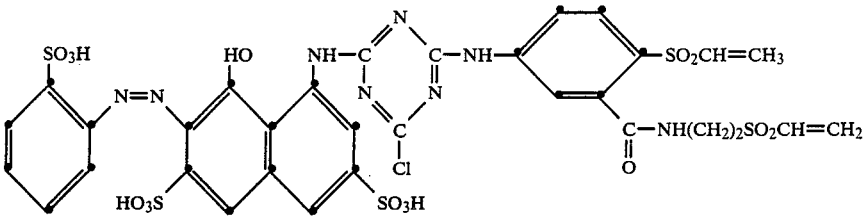

which dyes cotton in fast red shades.

Examples 69–81

The dyes mentioned in Table 5, which dye cotton in the particular shade mentioned, can be prepared analogously to Example 68.

TABLE 5

| Example No. | Dye | Shade on cotton |
|---|---|---|
| 69 | [Structure: naphthalene with SO₃H, SO₃H groups, N=N azo linkage to phenyl bearing NH-C(=O)-NH₂ and NH-triazine(Cl)-NH-phenyl bearing SO₂CH₂CH₂OSO₃H and C(=O)-NH(CH₂)₂SO₂(CH₂)₂OSO₃H] | golden-yellow |
| 70 | [Structure: naphthalene-disulfonic acid with N=N azo linkage to phenyl bearing NH-C(=O)-NH₂ and NH-triazine(Cl)-NH-phenyl bearing SO₂CH=CH₂ and C-NH(CH₂)₂SO₂CH=CH₂] | golden-yellow |
| 71 | [Structure: naphthalene-disulfonic acid with N=N azo linkage to phenyl bearing OCH₃ and CH₃ and NH-triazine(Cl)-NH-phenyl bearing SO₂CH=CH₂ and C-NH(CH₂)₂SO₂CH=CH₂] | golden-yellow |
| 72 | [Structure: naphthalene-disulfonic acid with N=N azo linkage to phenyl bearing NHCONH₂ and NH-triazine(Cl)-N=C-NH-phenyl bearing SO₂CH₂CH₂OSO₃H and C-NH(CH₂)₂SO₂(CH₂)₂OSO₃H] | golden-yellow |

TABLE 5-continued
| Example No. | Dye | Shade on cotton |
|---|---|---|
| 73 | 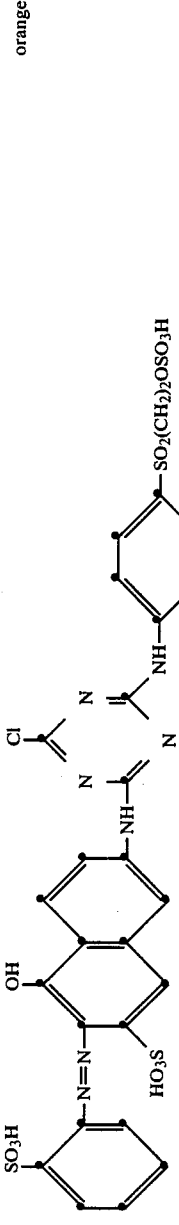 | orange |
| 74 | 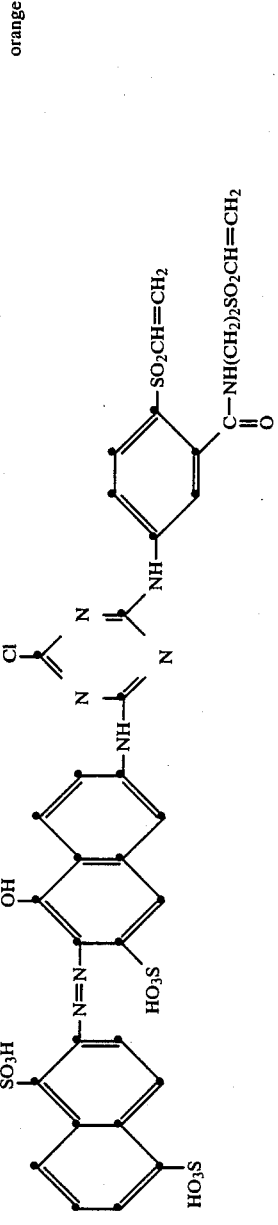 | orange |
| 75 | 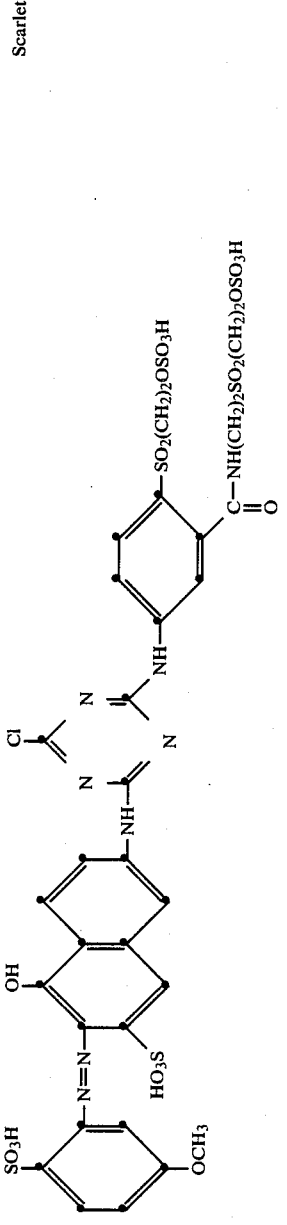 | Scarlet |

TABLE 5-continued
| Example No. | Dye | Shade on cotton |
|---|---|---|
| 76 | 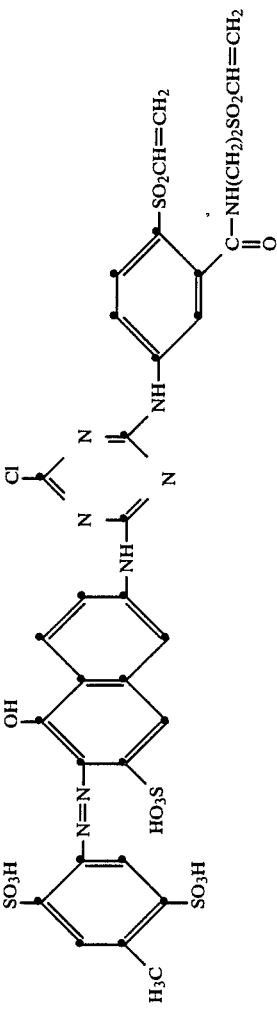 | orange |
| 77 | 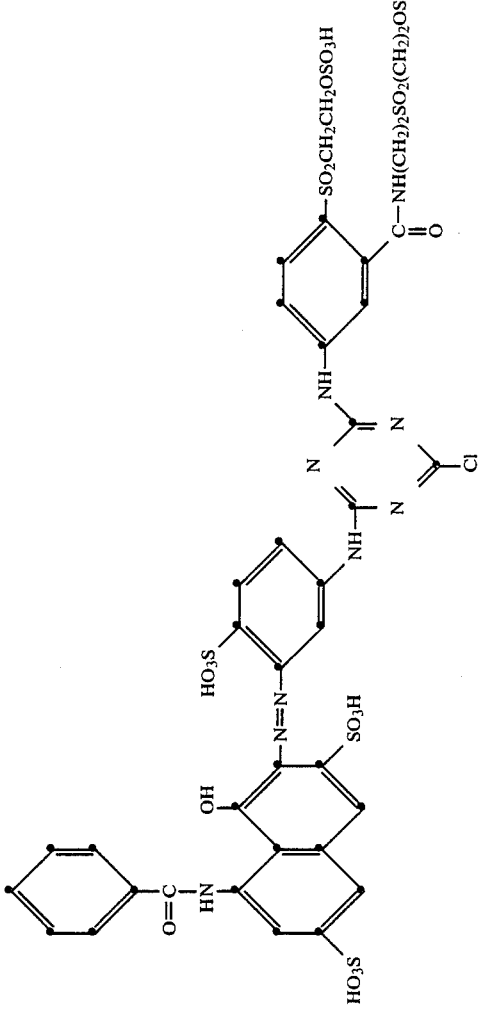 | red |

TABLE 5-continued

| Example No. | Dye | Shade on cotton |
|---|---|---|
| 78 | | red |
| 79 | | red |
| 80 | | bluish-tinged red |

TABLE 5-continued
| Example No. | Dye | Shade on cotton |
|---|---|---|
| 81 |  | bluish-tinged red |

Example 82

81 g (0.15 mol) of the compound of the formula (32) according to Example 5 are dissolved in 250 ml of ice water, and 0.1 mol of copper phthalocyanine trisulfochloride-monosulfonic acid, obtained by chlorosulfonating copper phthalocyanine in a known manner, are added. The mixture is stirred until homogeneous, and the pH is adjusted to 5.0 and kept at this value with 2N ammonia solution. The temperature is then allowed to rise to 20° C. in the course of 12 hours and stirring is then continued for a further 6 hours at 50° C.

The resulting dye solution is salted out with sodium chloride and the pH is adjusted to a value of 3.5. The dye is then filtered off, washed and dried. The dye has the formula

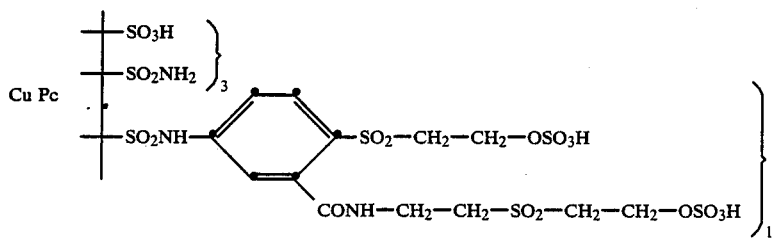

and produces turquoise blue dyeings having good fastness properties on cellulose fibres.

Dyeing instructions I 2 parts of the dye obtained in accordance with Example 6 are dissolved in 400 parts of water; 1,500 parts of a solution containing 53 g of sodium chloride per liter are added. 100 parts of a cotton fabric are introduced at 40° C. into this dye bath. After 45 minutes, 100 parts of a solution containing 16 g of sodium hydroxide and 20 g of calcined sodium carbonate per liter are added. The temperature of the dye bath is kept at 40° C. for a further 45 minutes. The dyed goods are then rinsed, soaped at the boil for a quarter of an hour with a nonionic washing agent, rinsed again and dried.

Dyeing instructions II 2 parts of the reactive dye obtained in accordance with Example 20 are dissolved in 400 parts of water; 1,500 parts of a solution containing 53 g of sodium chloride per liter are added. 100 parts of a cotton fabric are introduced into this dye bath at 35° C. After 20 minutes, 100 parts of a solution containing 16 g of sodium hydroxide and 20 g of calcined sodium carbonate per liter are added. The temperature of the dye bath is kept at 35° C. for a further 15 minutes. The temperature is then raised to 60° C. in the course of 20 minutes. The temperature is kept at 60° C. for a further 35 minutes. The goods are then rinsed, soaped at the boil for a quarter of an hour with a nonionic washing agent, rinsed again and dried.

Dyeing instructions III 8 parts of the reactive dye obtained in accordance with Example 21 are dissolved in 400 parts of water; 1,400 parts of a solution containing 100 g of sodium sulfate per liter are added. 100 parts of a cotton fabric are introduced into this dye bath at 25° C. After 10 minutes, 200 parts of a solution containing 150 g of trisodiumphosphate per liter are added. The temperature of the dye bath is then raised to 60° C. in the course of 10 minutes. The temperature is kept at 60° C. for a further 90 minutes. The goods are then rinsed, soaped at the boil for a quarter of an hour with a nonionic washing agent, rinsed again and dried.

Dyeing instructions IV 4 parts of the reactive dye obtained in accordance with Example 6 are dissolved in 50 parts of water. 50 parts of a solution containing 5 g of sodium hydroxide and 20 g of calcined sodium carbonate per liter are added. The resulting solution is used to pad a cotton fabric so that it takes up 70% of its weight, and it is then rolled up on a beam. The cotton fabric is stored under these conditions for 3 hours at room temperature. The dyed goods are then rinsed, soaped at the boil for a quarter of an hour with a nonionic washing agent, rinsed again and dried.

Dyeing instructions V 6 parts of the reactive dye obtained in accordance with Example 16 are dissolved in 50 parts of water. 50 parts of a solution containing 16 g of sodium hydroxide and 0.04 liter of water-glass (38° Bé) per liter are added. The resulting solution is used to pad a cotton fabric so that it takes up 70% of its weight, and it is then rolled up on a beam. The cotton fabric is stored under these conditions for 10 hours at room temperature. The dyed goods are then rinsed, soaped at the boil for a quarter of an hour with a nonionic washing agent, rinsed again and dried.

Dyeing instructions VI 2 parts of the reactive dye obtained in accordance with Example 13 are dissolved in 100 parts of water to which 0.5 part of sodium m-nitrobenzenesulfonate is added. The resulting solution is used to impregnate a cotton fabric so that it takes up 75% of its weight, and it is then dried. The fabric is then impregnated with a solution at 20° C., containing 4 g of sodium hydroxide and 300 g of sodium chloride per liter, and is squeezed out to a 75% increase in weight, and the dyeing is steamed for 30 seconds at 100° to 102° C., rinsed, soaped for a quarter of an hour in a 0.3% boiling solution of a nonionic washing agent, rinsed and dried.

Printing instructions I 3 parts of the reactive dye obtained in accordance with Example 6 are sprinkled, with rapid stirring, into 100 parts of a stock thickener containing 50 parts of 5% sodium alginate thickener, 27.8 parts of water, 20 parts of urea, 1 part of sodium m-nitrobenzenesulfonate and 1.2 parts of sodium bicarbonate. The printing paste thus obtained is used to print a cotton fabric, and the resulting printed material is dried and steamed for 2 minutes at 102° C. in saturated steam. The printed fabric is then rinsed, if necessary soaped at the boil and rinsed again, and is then dried.

Printing instructions II 5 parts of the reactive dye obtained in accordance with Example 7 are sprinkled, with rapid stirring, into 100 parts of a stock thickener containing 50 parts of 5% sodium alginate thickener, 36.5 parts of water, 10 parts of urea, 1 part of sodium m-nitrobenzenesulfonate and 2.5 parts of sodium bicarbonate. The printing paste thus obtained, the stability of which meets the technical requirements, is used to print a cotton fabric, and the resulting printed material is dried and steamed for 8 minutes at 102° C. in saturated steam. The printed fabric is then rinsed, if necessary soaped at the boil and rinsed again, and is then dried.

What is claimed is:

1. A reactive dye of the formula

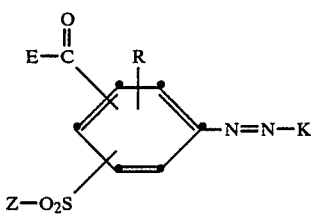

(2)

or of the formula

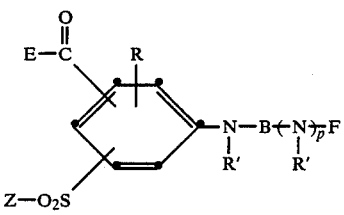

(14)

in which R is hydrogen, halogen, hydroxyl or sulfo, Z is a radical of the formula —CH=CH$_2$ or —CH$_2$—CH$_2$—Y, Y is a radical selected from the group consisting of

—OSO$_3$H, —SSO$_3$H, —OCOCH$_3$, —OPO$_3$H$_2$,

—O—CO—C$_6$H$_5$, —S—C(=S)—N(C$_2$H$_5$)$_2$, —Cl, —Br, —F,

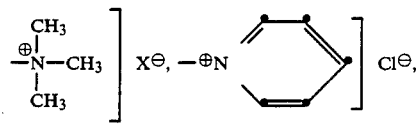

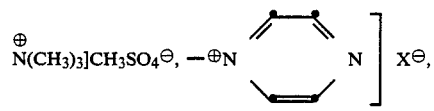

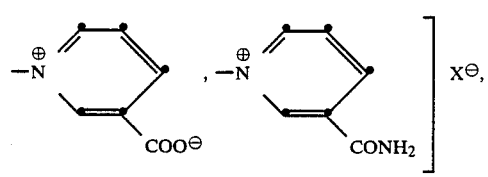

-continued

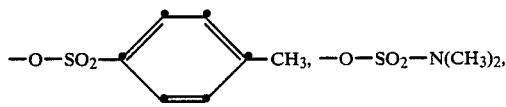

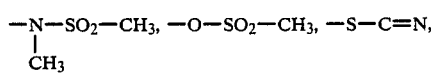

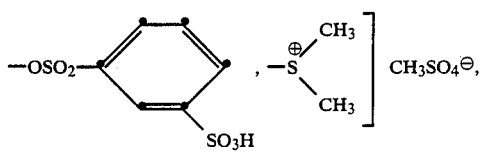

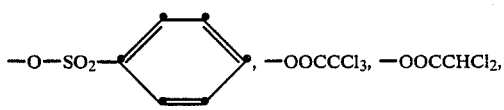

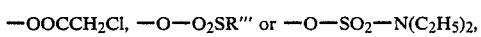

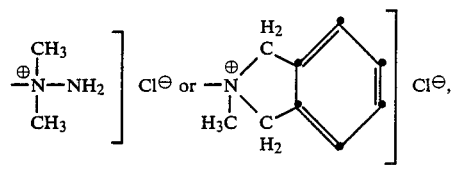

wherein X is halogen and R''' is alkyl or aryl, R' is hydrogen or C$_1$-C$_4$alkyl which is unsubstituted or substituted by —COOH, —CN, —OH or —SO$_3$H, and E is a radical of the formula

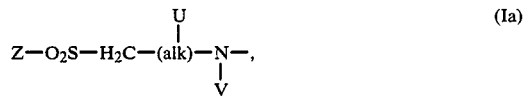 (Ia)

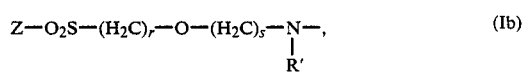 (Ib)

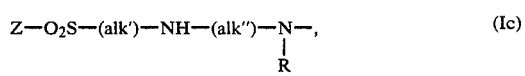 (Ic)

or

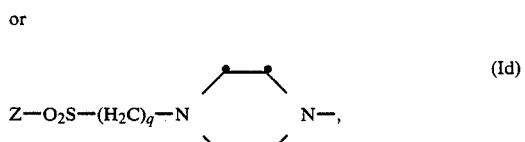 (Id)

in which R' and Z are as defined above, alk, alk' and alk'' independently of one another are C$_1$-C$_6$alkylene, U is hydrogen, halogen, hydroxyl, sulfato, C$_1$-C$_4$alkanoyloxy, cyano, carboxyl, C$_1$-C$_4$alkoxycarbonyl, carbamoyl or a radical —SO$_2$—Z in which Z is as defined above, V is hydrogen, C$_1$-C$_4$alkyl which is unsubstituted or substituted by halogen, hydroxyl, cyano, carboxyl, sulfo, sulfato, C$_1$-C$_4$-alkoxy or C$_1$-C$_4$alkoxycarbonyl, or a radical of the formula

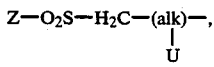

in which Z, alk and U are as defined above, q, r and s independently of one another are an integer from 1 to 6; K is a coupling component benzene, naphthalene or heterocyclic radical, B is a bridge member and F is a metal-free or metal-containing monoazo or disazo dye radical containing at least one —SO$_3$H— group, a 1-aminoanthraquinone or 1-anilinoanthraquinone radical, a sulfophthalocyanine dye radical or a formazan, phenazine, oxazine or nitroaryl dye radical and p is 0 or 1; and a metal complex of a dye of formula (2).

2. A reactive dye according to claim 1, of the formula (2), wherein K is a benzene, naphthalene, naphthylazobenzene, phenylazonaphthalene, pyrazolone, phenylpyrazolone, pyrazole or pyridone radical.

3. A reactive dye according to claim 1, of the formula (2), wherein K is unsubstituted or is substituted by C$_1$-C$_{14}$alkyl, C$_1$-C$_4$alkoxy, amino, N-mono-C$_1$-C$_4$alkylamino or N,N-di-C$_1$-C$_4$alkylamino which is unsubstituted or substituted by —OH, —OCOCH$_3$, —OSO$_3$H, —CN or halogen, phenylamino, C$_1$-C$_4$alkanoylamino, benzoylamino, C$_1$-C$_4$alkoxycarbonyl, nitro, cyano, trifluoromethyl, halogen, hydroxy, carboxyl, sulfo, sulfomethyl, sulfamoyl, N-mono-C$_1$-C$_4$alkylsulfamoyl, N,N-di-C$_1$-C$_4$alkylsulfamoyl, carbamoyl or N-mono-C$_1$-C$_4$alkylcarbamoyl or N,N-di-C$_1$-C$_4$-alkylcarbamoyl.

4. A reactive dye according to claim 3 of the formula (2), wherein K is substituted by sulfo, N-($\beta$-sulfatoethyl)amino, N,N-di-($\beta$-sulfatoethyl)-amino or an aliphatic sulfatable radical.

5. A reactive dye according to claim 1, of the formula

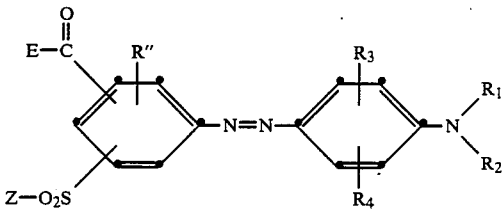

(3)

in which R'' is hydrogen or chlorine, R$_1$ and R$_2$ independently of one another are hydrogen or C$_1$-C$_4$alkyl or phenyl, each of which is unsubstituted or substituted by —OH, —OSO$_3$H, —OCOCH$_3$, —CN or halogen, and R$_3$ and R$_4$ independently of one another are hydrogen, halogen, C$_1$-C$_4$alkyl, C$_1$-C$_4$alkoxy, trifluoromethyl, C$_1$-C$_4$alkanoylamino or sulfo.

6. A reactive dye according to claim 1, of the formula

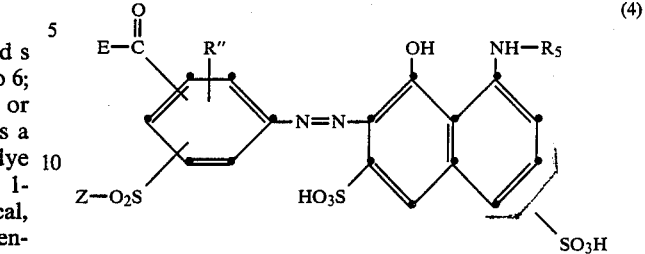

(4)

in which R'' is hydrogen or chlorine and R$_5$ is C$_1$-C$_4$alkanoyl, benzoyl or a radical of the formula

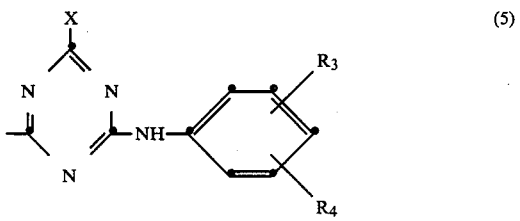

(5)

in which X is chlorine or fluorine and R$_3$ and R$_4$ independently of one another are hydrogen, halogen, C$_1$-C$_4$alkyl, C$_1$-C$_4$alkoxy, trifluoromethyl, C$_1$-C$_4$alkanoylamino or sulfo.

7. A reactive dye according to claim 1, of the formula

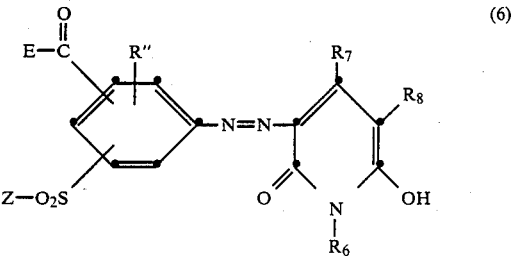

(6)

in which R'' is hydrogen or chlorine, R$_6$ and R$_7$ independently of one another are hydrogen, C$_1$-C$_4$alkyl or phenyl and R$_8$ is hydrogen, cyano, carbamoyl or sulfomethyl.

8. A reactive dye according to claim 1, of the formula

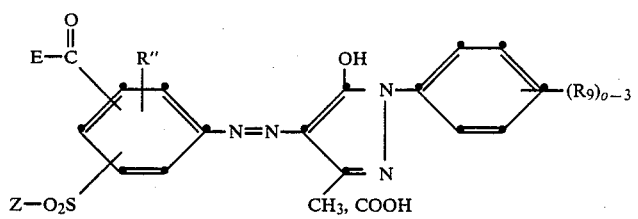

in which R'' is hydrogen or chlorine and R$_9$ is 0 to 3 identical or different substituents selected from the group consisting of chlorine, methyl, methoxy, carboxyl or sulfo.

9. A reactive dye according to claim 1, of the formula

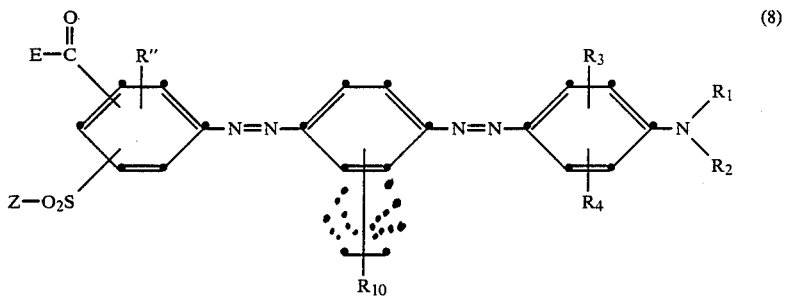

(8)

in which R'' is hydrogen or chlorine, $R_1$ and $R_2$ independently of one another are hydrogen or $C_1$-$C_4$alkyl or phenyl, each of which is unsubstituted or substituted by —OH, —OSO$_3$H, —OCOCH$_3$, —CN or halogen, $R_3$ and $R_4$ independently of one another are hydrogen, halogen, $C_1$-$C_4$-alkyl, $C_1$-$C_4$alkoxy, trifluoromethyl, $C_1$-$C_4$alkanoylamino or sulfo and $R_{10}$ is $C_1$-$C_4$alkyl, $C_1$-$C_4$alkoxy, halogen or sulfo.

10. A reactive dye according to claim 1, of the formula

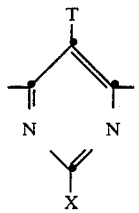

(15a)

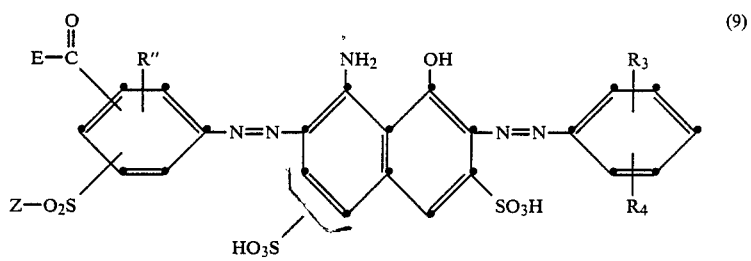

(9)

in which R'' is hydrogen or chlorine and $R_3$ and $R_4$ independently of one another are hydrogen, halogen, $C_1$-$C_4$alkyl, $C_1$-$C_4$alkoxy, trifluoromethyl, $C_1$-$C_4$alkanoylamino or sulfo.

11. A reactive dye according to claim 1, of the formula (14), wherein p is 0 to B is a direct bond or a —CH$_2$—, —CO— or —SO$_2$— group.

12. A reactive dye according to claim 11 of the formula

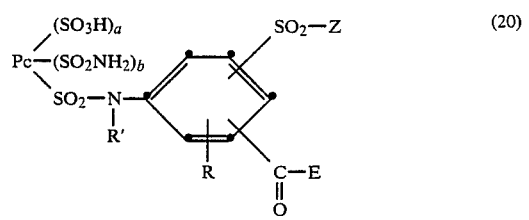

(20)

in which Pc is the radical of a metal-containing or metal-free phthalocyanine radical, and a and b are integers or fractional numbers from 1 to 3, a plus b together being 3.0.

13. A reactive dye according to claim 1 wherein p is 1 and B is a halogenopyrimidine radical of the formula in which X is halogen and T is —SO$_2$—CH$_3$, —CN, —Cl, —F, formyl or nitro, or is a halogenotriazine radical of the formula

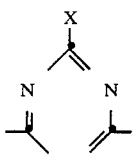

(15b)

in which X is

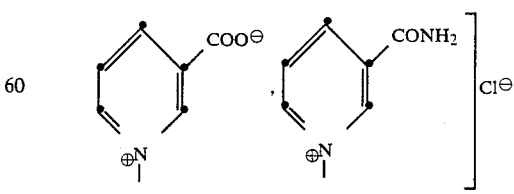

or halogen.

14. A reactive dye according to claim 13 wherein B is a reactive radical of the formula

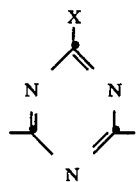

in which X is halogen.

15. A reactive dye according to claim 1 of the formula

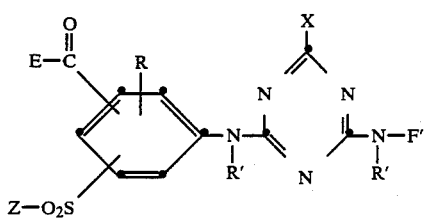 (16)

in which X is halogen and F' is the radical of a monoazo or diaszo dye of the formula $$D-N=N-(M-N=N-)_nK- \qquad (17a)$$

or of the formula $$-D-N=N-(M-N=N-)_nK \qquad (17b)$$

in which D is a diazo component benzene or naphthalene radical, M is a benzene or naphthalene radical, K is a coupling component benzene, naphthalene or heterocyclic radical and n is 0 or 1.

16. A reactive dye according to claim 15 of the formula

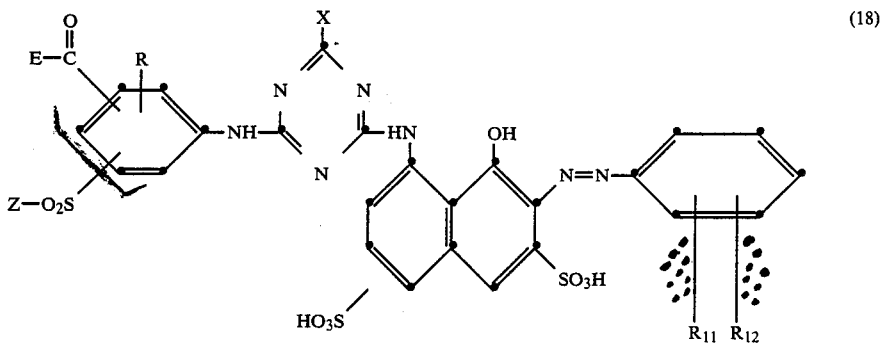 (18)

in which X is halogen and $R_{11}$ and $R_{12}$ independently of one another are hydrogen, sulfo and nitro.

17. A reactive dye according to claim 1 of the formula

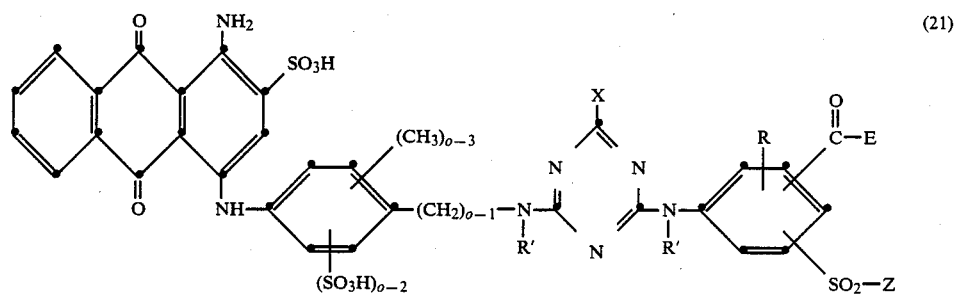 (21)

in which X is halogen.

18. A reactive dye according to claim 1 of the formula

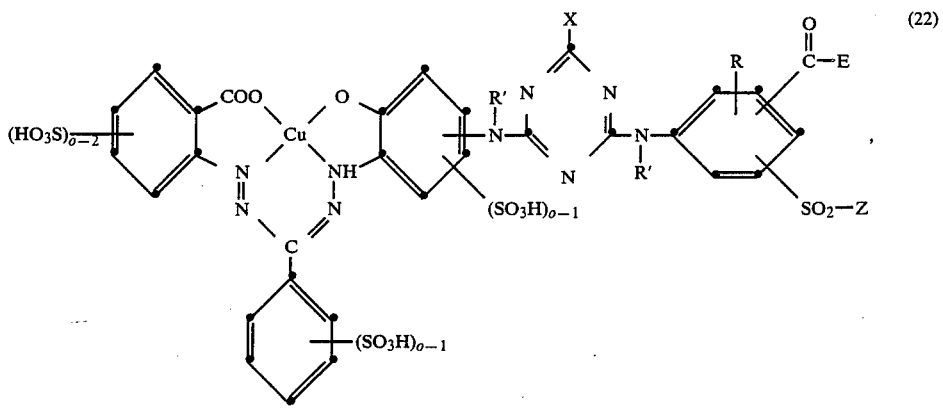
in which X is halogen.
19. A reactive dye according to claim 1 of the formula
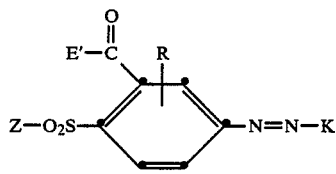
or of the formula
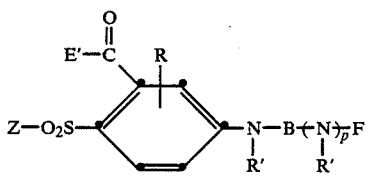
in which E' is a radical of the formula
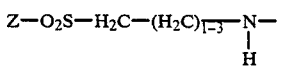
or
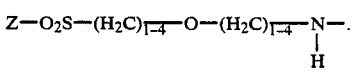
20. A compound of the formula
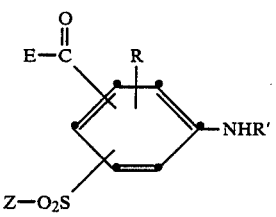
wherein R is hydrogen, halogen, hydroxyl or sulfo, Z is a radical of the formula $-CH=CH_2$ or $-CH-CH_2-Y$, Y is a radical selected from the group consisting of
$-OSO_3H$, $-SSO_3H$, $-OCOCH_3$, $-OPO_3H_2$,
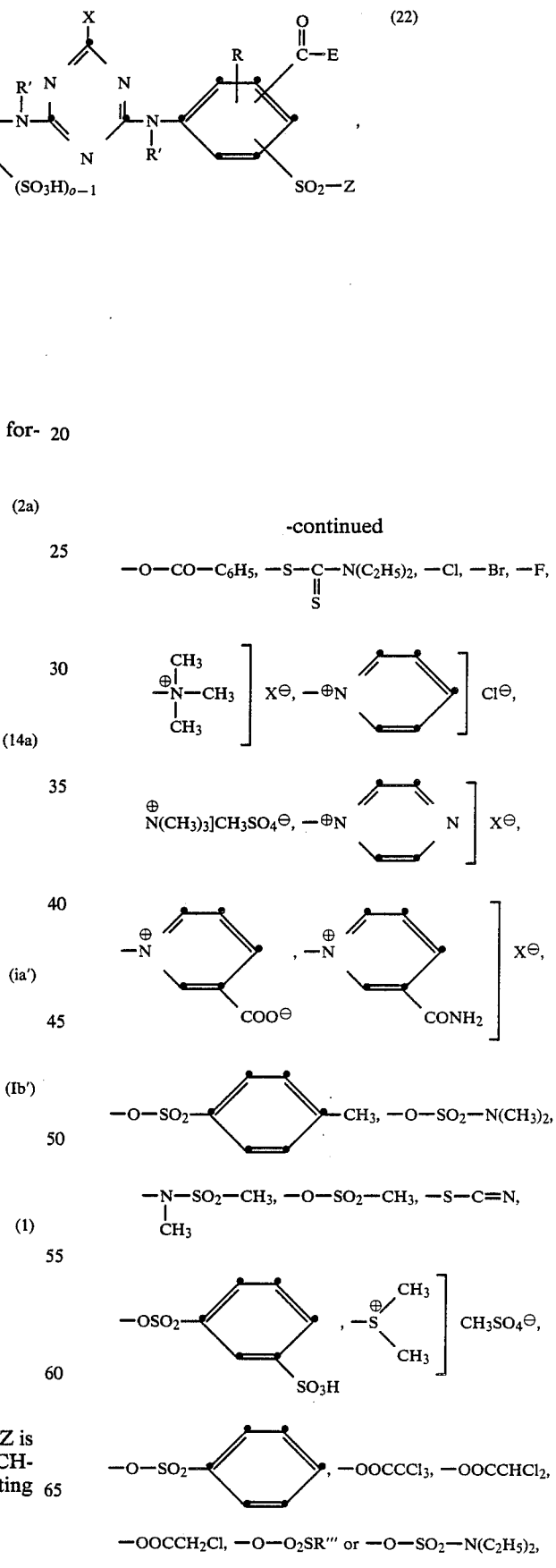

-continued

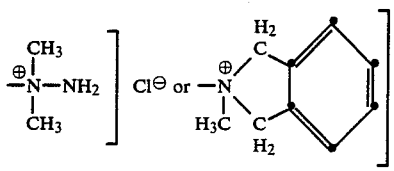

wherein X is halogen and R''' is alkyl or aryl, R' is hydrogen or $C_1$-$C_4$alkyl which is unsubstituted or substituted by —COOH, —CN, —OH or —SO$_3$H, and E is a radical of the formula

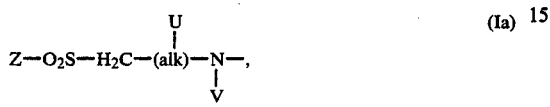 (Ia)

$$Z-O_2S-(H_2C)_r-O-(H_2C)_s-\underset{R'}{N}-, \quad (Ib)$$

$$Z-O_2S-(alk')-NH-(alk'')-\underset{R}{N}-, \quad (Ic)$$

or

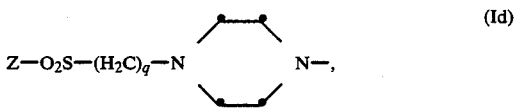 (Id)

in which R' and Z are as defined above, alk, alk' and alk" independently of one another are $C_1$-$C_6$alkylene, U is hydrogen, halogen, hydroxyl, sulfato, $C_1$-$C_4$alkanoloxy, cyano, carboxyl, $C_1$-$C_4$alkoxycarbonyl, carbonyl or a radical —SO$_2$—Z in which Z is as defined above, V is hydrogen, $C_1$-$C_4$alkyl which is unsubstituted or substituted by halogen, hydroxyl, cyano, carboxyl, sulfo, sulfato, $C_1$-$C_4$alkoxy or $C_1$-$C_4$alkoxycarbonyl, or a radical of the formula $$Z-O_2S-H_2C-\underset{U}{(alk)}-,$$

in which Z, alk and U are as defined above, and q, r and s independently of one another are an integer from 1 to 6.

21. A compound according to claim 20 of the formula

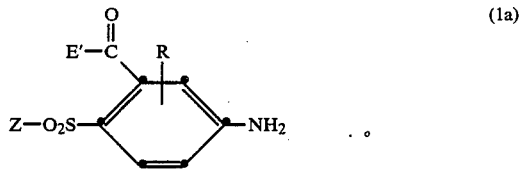 (1a)

in which E' is a radical of the formula $$Z-O_2S-H_2C-(H_2C)_{\overline{1-3}}-\underset{H}{N}- \quad (ia')$$

or

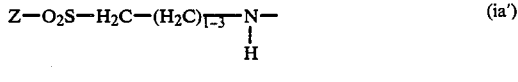 (Ib')

* * * * *